(12) United States Patent
Brown et al.

(10) Patent No.: US 11,805,871 B2
(45) Date of Patent: *Nov. 7, 2023

(54) CASE FOR PORTABLE ELECTRONIC DEVICE

(71) Applicant: Vinci Brands LLC, Irvine, CA (US)

(72) Inventors: Jonathan Brown, Monrovia, CA (US); Steven Corraliza, North Miami Beach, FL (US); Eric James Hostetler, Orange, CA (US); William Ho, Chino Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/447,931

(22) Filed: Sep. 16, 2021

(65) Prior Publication Data

US 2022/0000230 A1 Jan. 6, 2022

Related U.S. Application Data

(63) Continuation of application No. 16/773,979, filed on Jan. 27, 2020, now abandoned, which is a continuation-in-part of application No. 15/335,419, filed on Oct. 26, 2016, now Pat. No. 10,542,802, which is a continuation-in-part of application No. 29/546,706, filed on Nov. 24, 2015, now Pat. No. Des. 808,373, and a continuation-in-part of application No. 29/546,705, filed on Nov. 24, 2015, now Pat. No. Des. 808,372.

(60) Provisional application No. 62/246,554, filed on Oct. 26, 2015.

(51) Int. Cl.
*A45C 11/00* (2006.01)
*B29C 45/14* (2006.01)
*B29L 31/00* (2006.01)
*B29K 69/00* (2006.01)
*B29K 75/00* (2006.01)

(52) U.S. Cl.
CPC .............. *A45C 11/00* (2013.01); *B29C 45/14* (2013.01); *A45C 2011/002* (2013.01); *A45C 2011/003* (2013.01); *B29K 2069/00* (2013.01); *B29K 2075/00* (2013.01); *B29L 2031/7162* (2013.01)

(58) Field of Classification Search
CPC .............. A45C 11/00; A45C 2011/002; A45C 2011/003; B29L 2031/7162; B29L 45/14
USPC ........................................................ 206/320
See application file for complete search history.

(56) References Cited

U.S. PATENT DOCUMENTS

| | | | |
|---|---|---|---|
| 8,706,176 B1* | 4/2014 | Jia ........................... | H04M 1/04 |
| | | | 455/575.8 |
| 10,076,168 B2* | 9/2018 | Sirichai ................... | F16M 13/00 |
| 2010/0300909 A1* | 12/2010 | Hung ....................... | H04M 1/04 |
| | | | 206/320 |
| 2011/0095033 A1* | 4/2011 | Hung ....................... | H04B 1/3888 |
| | | | 220/602 |
| 2014/0202891 A1* | 7/2014 | Piatt ....................... | G06F 1/1628 |
| | | | 206/45.24 |

(Continued)

*Primary Examiner* — Steven A. Reynolds
(74) *Attorney, Agent, or Firm* — Qadeer LLC

(57) ABSTRACT

A case for a portable electronic device that includes a rigid outer layer and a more flexible inner layer is disclosed herein. The case is a single piece case. The outer layer has openings that extend through the thickness of the outer layer. The openings are connected by a groove in the outer layer. The openings and the groove may be filled by a more flexible material. The inner layer has openings. The outer layer is translucent so that the inner layer may be visible through the outer layer.

8 Claims, 26 Drawing Sheets

(56) References Cited

U.S. PATENT DOCUMENTS

| | | | |
|---|---|---|---|
| 2014/0202899 A1* | 7/2014 | Murchison | G06F 1/1628 206/320 |
| 2015/0068935 A1* | 3/2015 | Kay | G06F 1/1656 206/320 |
| 2015/0194995 A1* | 7/2015 | Fathollahi | H04M 1/0202 455/575.8 |

* cited by examiner

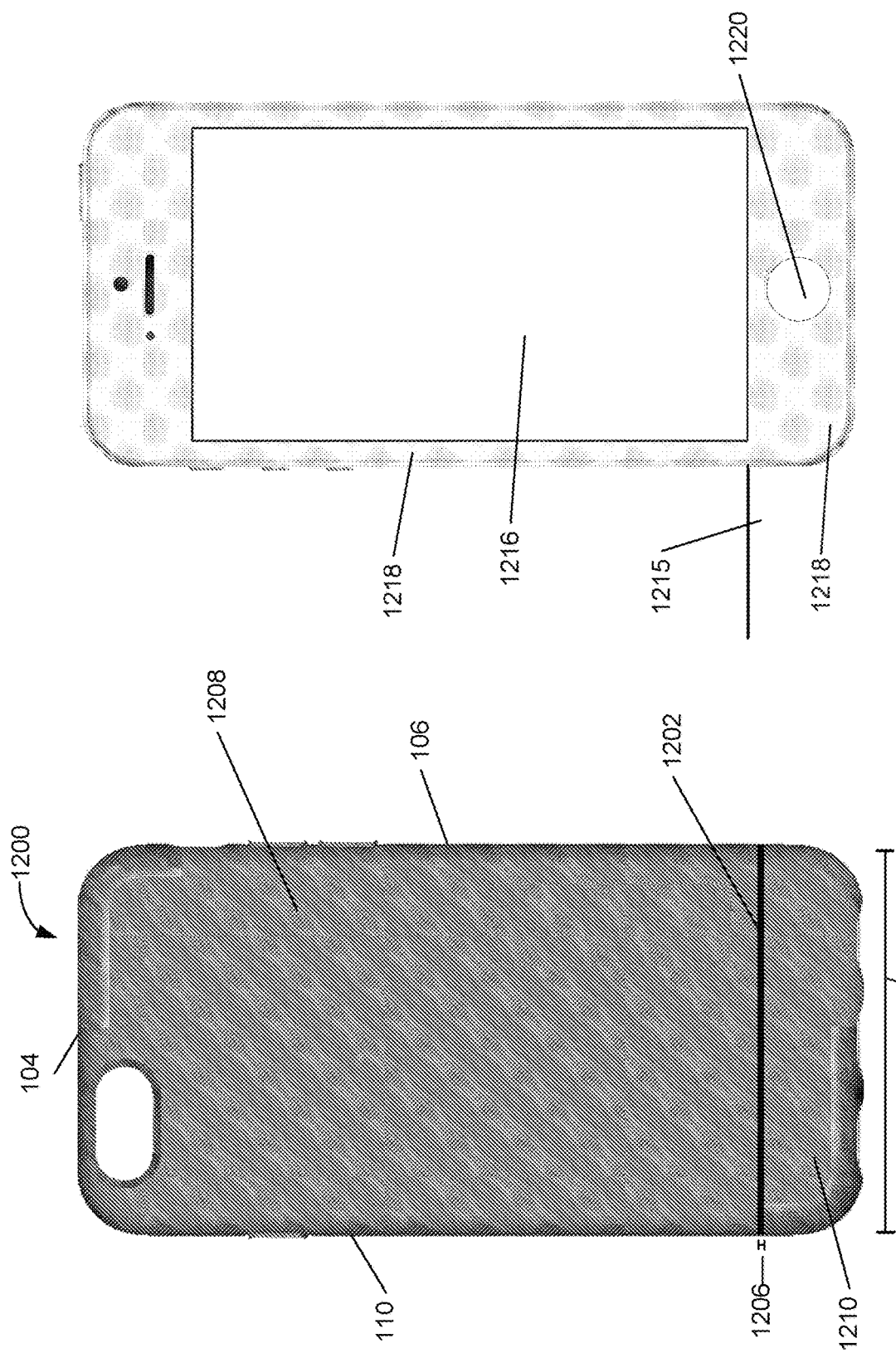

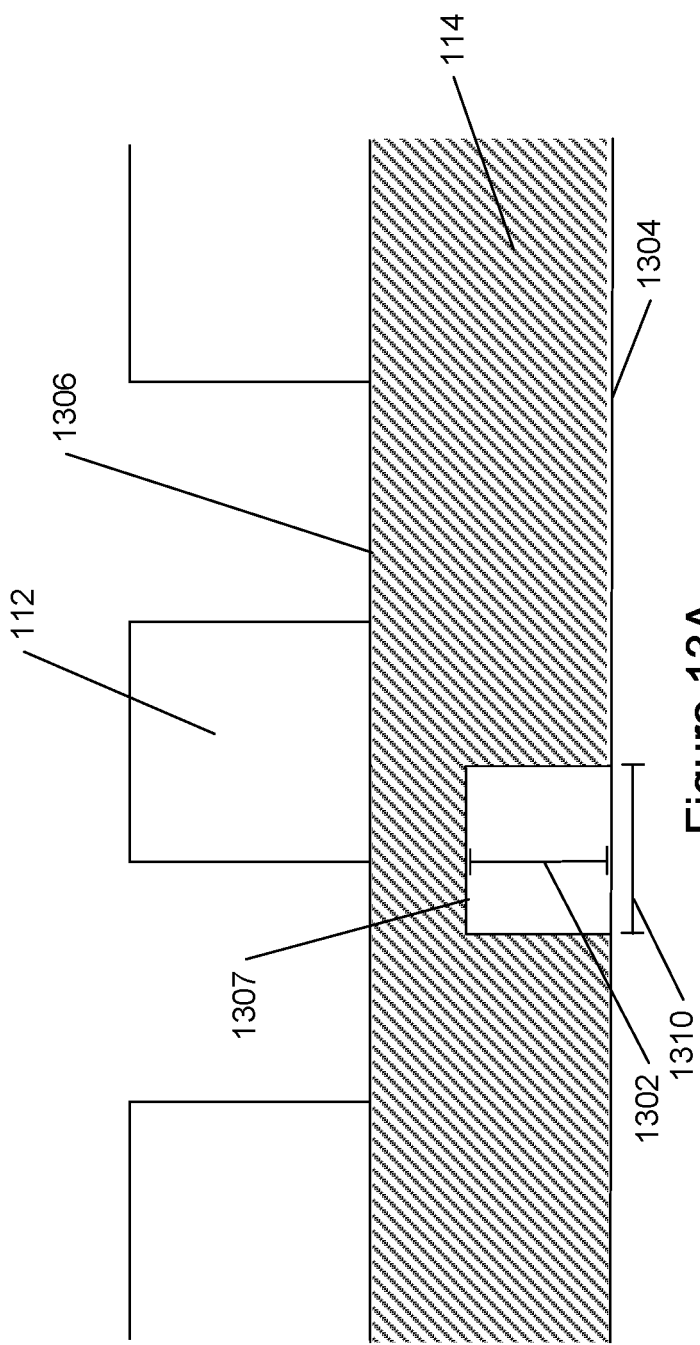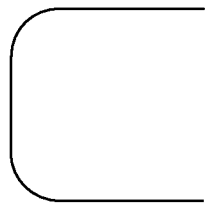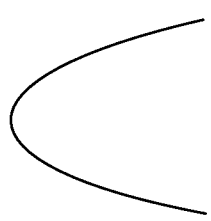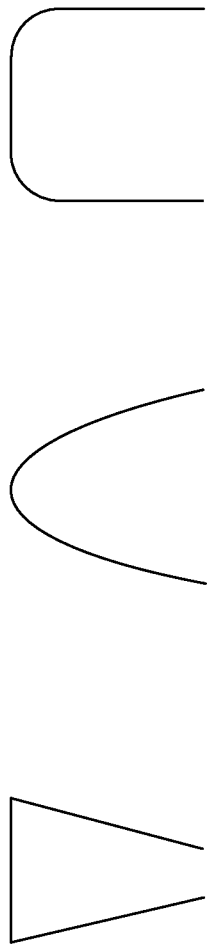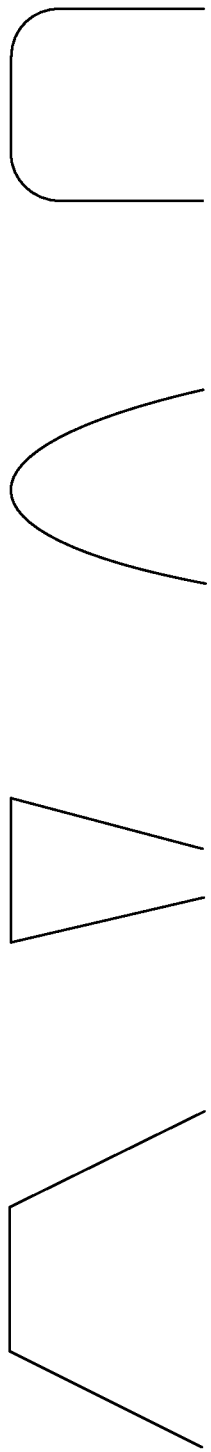
Figure 13A
Figure 13B
Figure 13C
Figure 13D
Figure 13E

CASE FOR PORTABLE ELECTRONIC DEVICE

CROSS-REFERENCE TO RELATED APPLICATIONS

This application is a continuation of U.S. patent application Ser. No. 16/773,979, filed on Jan. 27, 2020; which is a continuation-in-part of U.S. patent application Ser. No. 15/335,419, filed on Oct. 26, 2016 and issued as U.S. Pat. No. 10,542,802 on Jan. 28, 2020; which is a continuation-in-part of U.S. Design patent application Ser. Nos. 29/546,705 and 29/546,706, filed on Nov. 24, 2015 and issued as U.S. Design Pat. Nos. D808,372 and D808,373, respectively, on Jan. 23, 2018, and which also claims the benefit of and priority to U.S. Provisional Patent Application Ser. No. 62/246,554, filed on Oct. 26, 2015; the entireties of which are hereby incorporated herein by reference.

BACKGROUND

Field of the Invention

The present disclosure relates to cases for electronic devices, particularly portable electronic devices like smartphones and tablets.

Description of the Related Art

Mobile devices, such as smartphones, tablets, laptops, and the like, are known to sustain damage from impact and from contamination as a result of the ingress of water or other fluids. Such damage may result, for example, in a cracked screen, scratches on a finished surface, lost or damaged buttons or controls, cracked or bent external body components, and/or failed or malfunctioning electrical components. Protective cases can protect mobile devices from such damage and other types of damage.

SUMMARY

A case for a portable electronic device that includes a rigid outer layer and a more flexible inner layer is disclosed herein. The case may preferably be a single piece. The inner layer of the case may preferably have openings. The outer layer of the case may preferably be translucent so that the inner layer is visible through the outer layer.

In some embodiments, the case includes a base portion including a first layer, where the first layer includes an interior surface and an exterior surface; first, second, third, and fourth sidewalls connected to the base portion, where the first, second, third, and fourth sidewalls surround the electronic device, and the first and third sidewalls are shorter than the second and fourth sidewalls; and a groove, formed in the first layer in the back portion, where the groove extends from the exterior surface of the first layer toward the interior surface of the first layer a first depth at a groove bottom surface, and where the groove includes a first width, the groove extends from a first end to a second end, and the first end is opposite to the second end.

The case may include a first opening, formed in the first layer in the back portion, where the first opening includes a second width and a second depth, where the second depth extends from at least the exterior surface of the first layer to the interior surface, the first opening includes a third end and a fourth end, and the third end is connected to the first end of the groove; and a second opening, formed in the first layer in the back portion, where the second opening includes a third width and a third depth, the third depth extends from at least the exterior surface of the first layer to the interior surface, the first opening includes a fifth end and a sixth end, and the fifth end is connected to the second end of the groove.

Each of the foregoing and various aspects, together with those set forth in the claims and summarized above or otherwise disclosed herein, including the figures, may be combined without limitation to form claims for a device, apparatus, system, method of manufacture, and/or method of use.

BRIEF DESCRIPTION OF THE DRAWINGS

The figures provided herewith are intended to illustrate but not to limit the invention. Like reference characters in the figures denote corresponding features consistently throughout similar embodiments.

FIG. 12A shows an embodiment of the case that includes a channel in the second (or outer) layer of the base.

FIG. 12B shows a picture of a phone that can fit into the case of FIG. 12A.

FIG. 13A shows a cross section of an embodiment of the base that includes the channel.

FIGS. 13B-13E show various implementations of the channel.

DETAILED DESCRIPTION OF THE ILLUSTRATED EMBODIMENTS

Figure 2A:
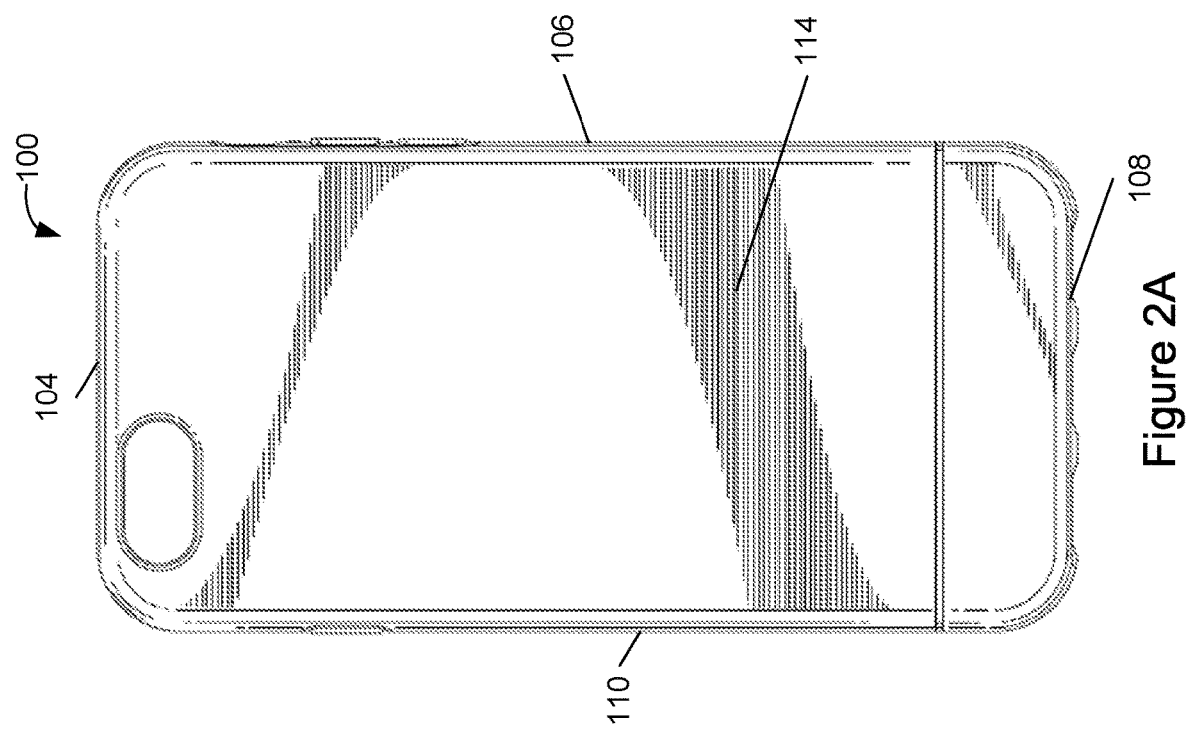
FIG. 2A shows a back view of the embodiment of the case shown in FIG. 1.

A case for a portable electronic device that includes a rigid outer layer and a more flexible inner layer is disclosed herein. The case may preferably be a single piece. The inner layer of the case may preferably have openings. The outer layer of the case may preferably be translucent so that the inner layer is visible through the outer layer.

In some embodiments, the case includes a base portion including a first layer, where the first layer includes an interior surface and an exterior surface; first, second, third, and fourth sidewalls connected to the base portion, where the first, second, third, and fourth sidewalls surround the electronic device, and the first and third sidewalls are shorter than the second and fourth sidewalls; and a groove, formed in the first layer in the back portion, where the groove extends from the exterior surface of the first layer toward the interior surface of the first layer a first depth at a groove bottom surface, and where the groove includes a first width, the groove extends from a first end to a second end, and the first end is opposite to the second end.

The case may include a first opening, formed in the first layer in the back portion, where the first opening includes a second width and a second depth, where the second depth extends from at least the exterior surface of the first layer to the interior surface, the first opening includes a third end and a fourth end, and the third end is connected to the first end of the groove; and a second opening, formed in the first layer in the back portion, where the second opening includes a third width and a third depth, the third depth extends from at least the exterior surface of the first layer to the interior surface, the first opening includes a fifth end and a sixth end, and the fifth end is connected to the second end of the groove.

FIGS. 1-7 show an embodiment 100 of the case. Specific embodiments of cases incorporating aspects of the present disclosure may be manufactured by Incase Designs Corp. and may be known as the Smart SYSTM Case.

The disclosed case provides protection for a portable electronic device through a low profile, dual-layer construction that maintains the device's minimal profile. A durable hardshell exterior is co-molded with a soft, impact-absorbing inner layer for complete protection in a flexible, secure, and lightweight form.

Features of the disclosed case include textured exterior for enhanced grip, a raised bezel around the perimeter to keep the device screen protected while the durable hardshell exterior provides surface protection, a flexible interior lining to absorb impact and distribute shock, a precision-engineered design to provide full access to all ports and controls. In particular, the durable exterior is co-molded with a soft, impact-absorbing inner layer for complete protection. The flexible material that covers the buttons is the proper thickness for facile activation of the phone.

The disclosed case may be a one-piece case. In a two-piece case, there are two pieces that are separated so that a device can be inserted into the case. Then the case may be reassembled. To use the disclosed one-piece case, a user inserts a device into the case and flexes the edges or sidewalls of the case to extend around the edges of the device. The case includes cutouts and buttons so the user can access the control features and ports of the device without taking the device out of the case.

Figure 1:
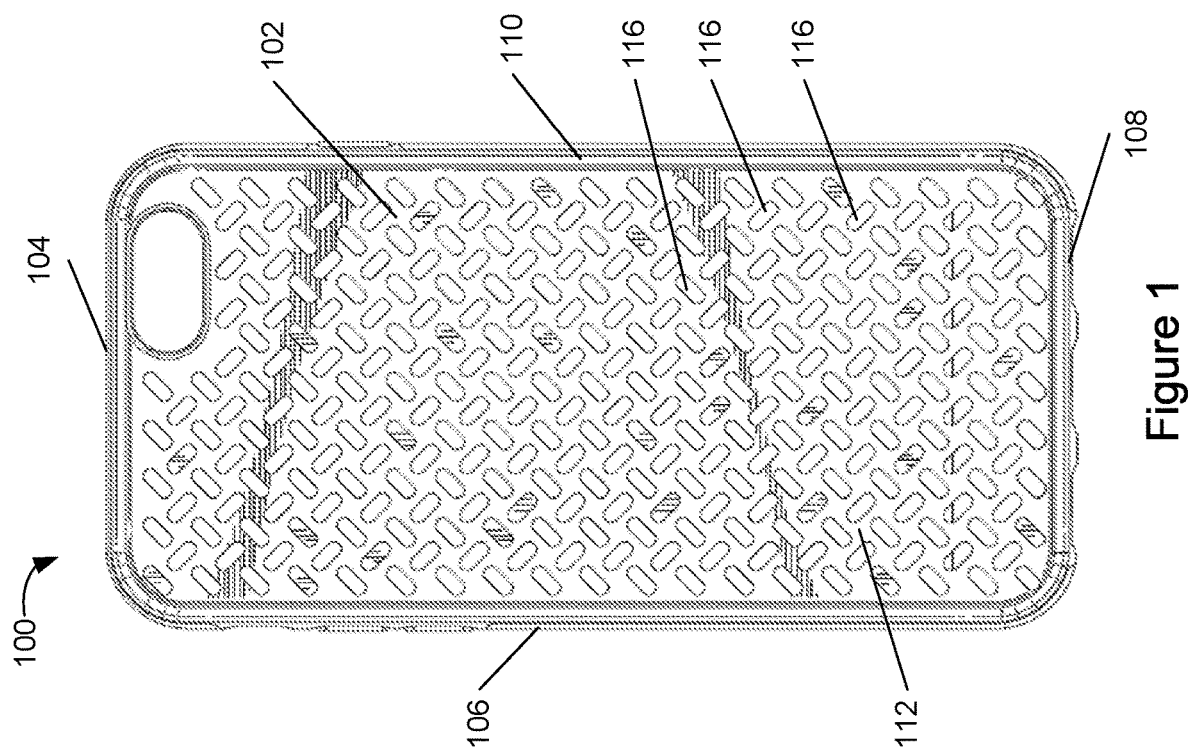
FIG. 1 shows a front view of an embodiment of the case.
Figure 2B:
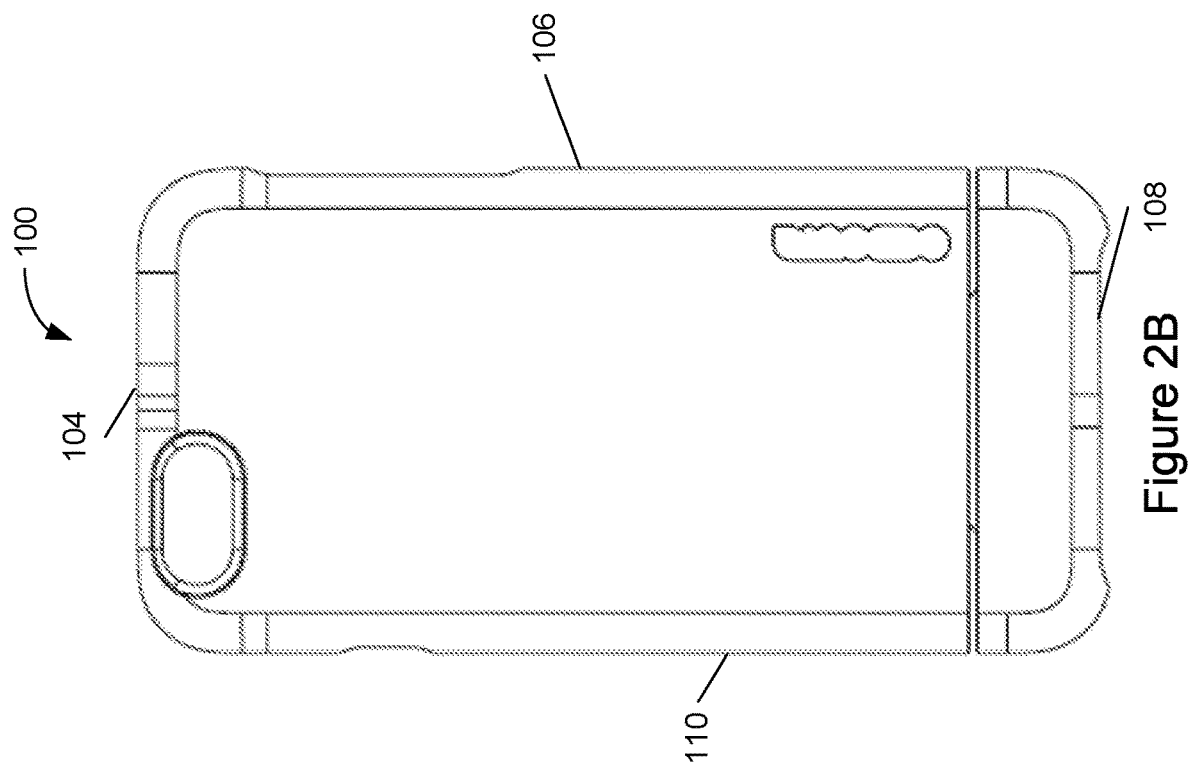
FIG. 2B shows another implementation of the back view of the embodiment of the case shown in FIG. 1.
Figure 3:
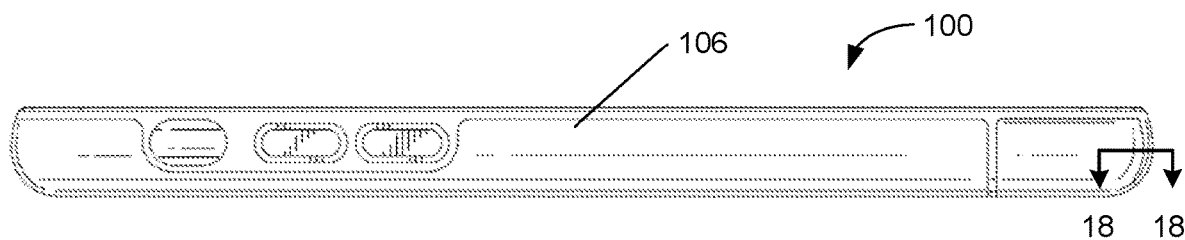
FIG. 3 shows a left side view of the embodiment of the case shown in FIG. 1.
Figure 4:
FIG. 4 shows a right side view of the embodiment of the case shown in FIG. 1.
Figure 5:
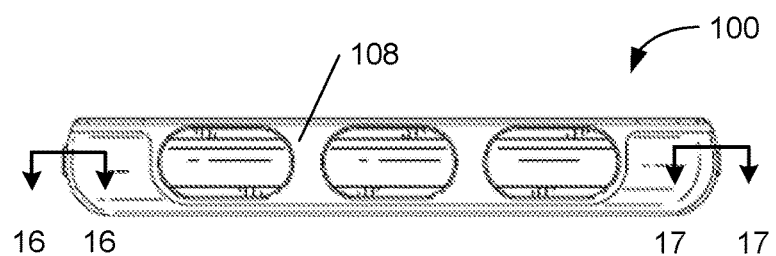
FIG. 5 shows a bottom view of the embodiment of the case shown in FIG. 1.
Figure 6:
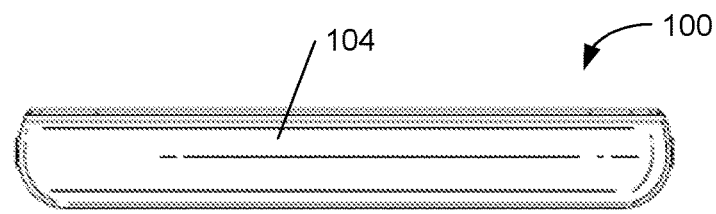
FIG. 6 shows a top view of the embodiment of the case shown in FIG. 1.
Figure 7:
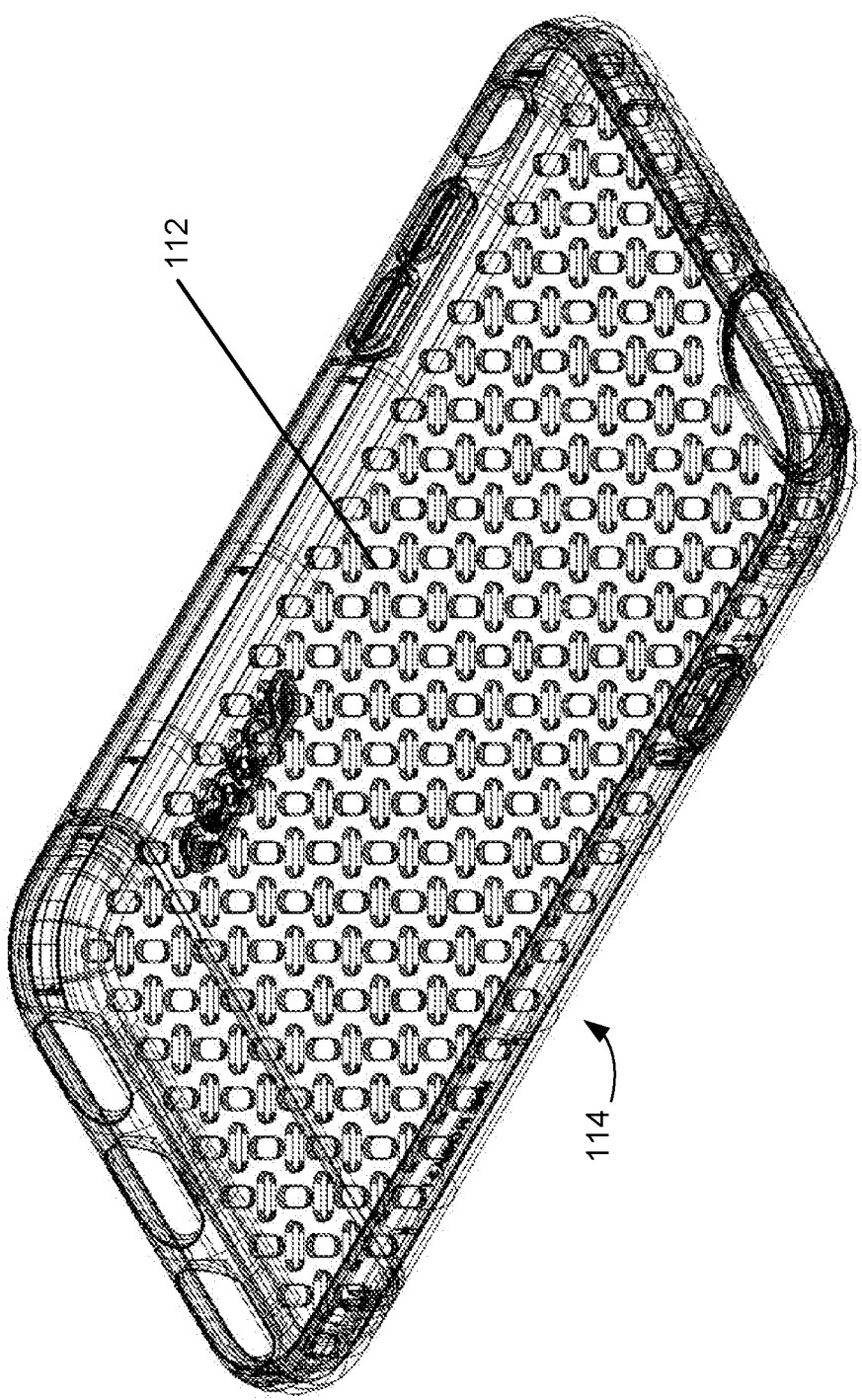
FIG. 7 shows a perspective view of the embodiment of the case shown in FIG. 1 with contour lines.

FIG. 1 shows a front view of an embodiment of the case. FIG. 2A shows a back view of the embodiment shown in FIG. 1. FIG. 2B shows another implementation of the back view of the embodiment shown in FIG. 1. FIG. 3 shows a left side view of the embodiment shown in FIG. 1. FIG. 4 shows a right side view of the embodiment shown in FIG. 1. FIG. 5 shows a bottom view of the embodiment shown in FIG. 1. FIG. 6 shows a top view of the embodiment shown in FIG. 1. FIG. 7 shows a perspective view of the embodiment shown in FIG. 1 with contour lines.

The case includes a base (or back portion) 102 against which a back of the electronic device will be placed. A first (or top) sidewall 104 and second (or left) sidewall 106 are connected to the base. The first sidewall is adjacent to the second sidewall. A third (or bottom) sidewall 108 is connected to the base at an end opposite to the first sidewall. A fourth (or right) sidewall 110 is connected to the base at an end opposite of the second sidewall.

In some embodiments, the base includes a first (or inner) layer 112 and a second (or outer) layer 114 that is connected to the first layer.

The first and second layers may be produced separately (e.g., through injection molding, compression molding, or the like) and then connected together, such as through use of an adhesive. Alternatively, the first layer may be co-molded to the second layer, where a first material for the first layer is poured into a mold for the case and after the first material has partially set, a second material for the second layer is poured into the mold. In other embodiments, the second layer is co-molded to the first layer.

The first and second layers may be polycarbonate (PC), gel, silicone, rubber, thermoplastic polyurethane (TPU), thermoplastic elastomer (TPE), thermoplastic rubber (TPR), fiberglass, carbon fiber, polymethyl methacrylate (PMMA or acrylic glass), or other suitable materials, or may be a composite or combination of materials. For example, the first layer may be TPU and the second layer may be PC.

As another example, the first layer may have a first durometer and the second layer may have a second durometer. The second durometer may be greater than the first durometer such that the second layer is harder than the first layer. The second durometer may be about 75 on a type D scale, which is about the value for hard plastic. The first durometer may be about 50 on a type D scale, which is about the value for rubber or solid truck tires.

In some embodiments, the second layer (outer or exterior layer) is a translucent hard plastic, where light can shine through the material. The first layer (inner layer), which is bonded to the second layer, is a nontranslucent elastic material (e.g., TPU). Light will shine through the translucent hard plastic but not through the non-translucent elastic material. The non-translucent elastic material may be patterned, such as having a geometric pattern as shown in FIG. 1, lettering, shapes, or another pattern. In such embodiments, light will shine through any openings in the pattern of the non-translucent material and will be visible through the translucent material. For example, the back of the phone may be seen through the translucent material through the openings in the non-translucent material.

In other embodiments, the first layer is non-translucent or opaque and the second layer is non-translucent. In yet other embodiments, the first layer and second layers are both translucent, and the first and second layers may have differing levels of translucence. In yet other embodiments, the first layer is non-translucent and the second layer is translucent.

The first or second or both layers may have openings 116 in a pattern. The pattern can include an alternating crisscross of obround-shaped openings. The resulting patterns appear like an industrial metal sheet with a textured pattern such as a rigidized steel sheet with an embossed raised pattern or lug. Alternatively, the pattern may be a perforated pattern including holes. In another embodiment, a first opening is arranged in a first direction and a second opening is arranged in a second direction transverse to the first direction. The arrangement of the first and second openings may be repeated in a pattern.

For example, in the embodiment shown in FIGS. 1-2, the first layer has openings and the second layer has no openings. In other embodiments, the first layer has no openings and the second layer has openings. The openings may act as compressible air gaps similar to air-filled bags in shipping containers and protect the electronic device from impact. The openings may be elongated ovals (such as the openings shown in FIG. 1), circles, triangles, squares, other polygons, or any composite or combination of these. The openings may be arranged in a regular pattern. For example, the elongated oval openings in FIG. 1 are arranged in a T shape where a vertical portion and a horizontal portion of the T shape are separated by a gap, and the T shape is repeated in a regular pattern. In other embodiments, the openings may be arranged in an irregular pattern. For example, the first layer may have openings located along the first sidewall or the openings may be distributed non-uniformly across the first layer or second layer.

The openings may provide texture such that the case grips the electronic device so that the electronic device does not inadvertently slide out of the case.

Figure 8:
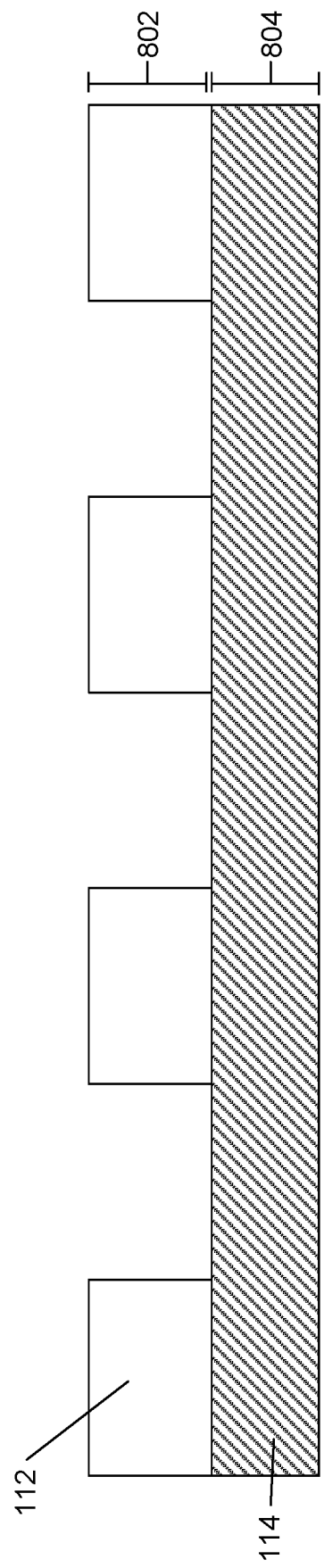
FIG. 8 shows a cross-sectional view of an embodiment of the first and second layers.

FIG. 8 shows a cross-sectional view of an embodiment of the first and second layers. The first layer may have a first thickness 802 and the second layer may have a second thickness 804. For example, the first thickness to second thickness ratio may be approximately 10:1, 8:1, 5:1, 4:1, 3:1, 2:1, 1:1, 1:2, 1:3, 1:4, or 1:10. Depending on the electronic device to be used with the case, different ratios may be used. For example, if the electronic device is made of a material that tends to shatter when dropped or brittle, then a ratio with a thicker layer of a lower durometer (or softer) material may be desired because the softer material may slow down an impact more than a harder material and thereby protect a device made of more brittle material.

The first, second, third, and fourth sidewalls may be polycarbonate (PC), gel, silicone, rubber, thermoplastic polyurethane (TPU), thermoplastic elastomer (TPE), thermoplastic rubber (TPR), fiberglass, carbon fiber, or many other materials, or may be a composite or combination of materials. As an example, a sidewall may have more than one section and each section may have a different composition of materials.

Figure 9:
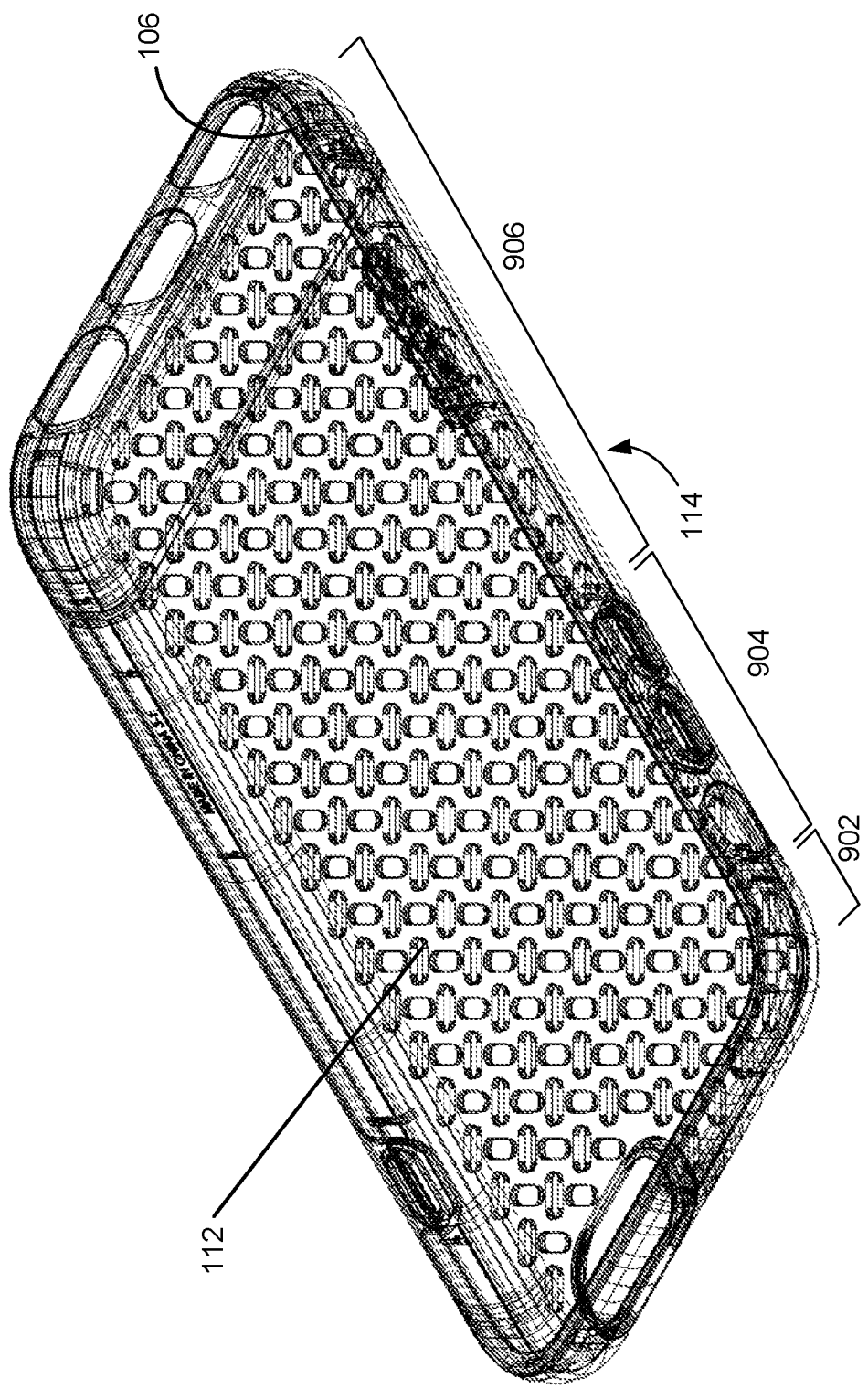
FIG. 9 shows a case with a specific implementation of sections of the second sidewall.

FIG. 9 shows an embodiment of sections of the second sidewall. In a specific example, the second sidewall includes a first section 902, a second section 904, and a third section 906. The first and third sections include a layer of polycarbonate and thermoplastic polyurethane. The second section includes thermoplastic polyurethane and less polycarbonate compared to the first and third sections. Because the second section is made of more flexible material, the second section can be moved (e.g., bent or stretched around) more in comparison to its less flexible adjacent sections. Having a more flexible section between more rigid sections may assist a user in securing a device into the disclosed case. With multiple flexible sections in the sidewalls of the case, the user may be able to more easily place the device into the case.

The case may have openings or covered buttons for use of features of electronic device. For example, some features of the electronic device include controls (e.g., buttons, switches) along a left or right side edge or along both edges of the phone that may enable a user to sleep or wake the device, turn the device on or off, or adjust the volume. Other features of the electronic device include ports for audio jacks, lightning ports, or universal serial bus (USB) or mini USB ports, or a combination thereof.

Figure 10:
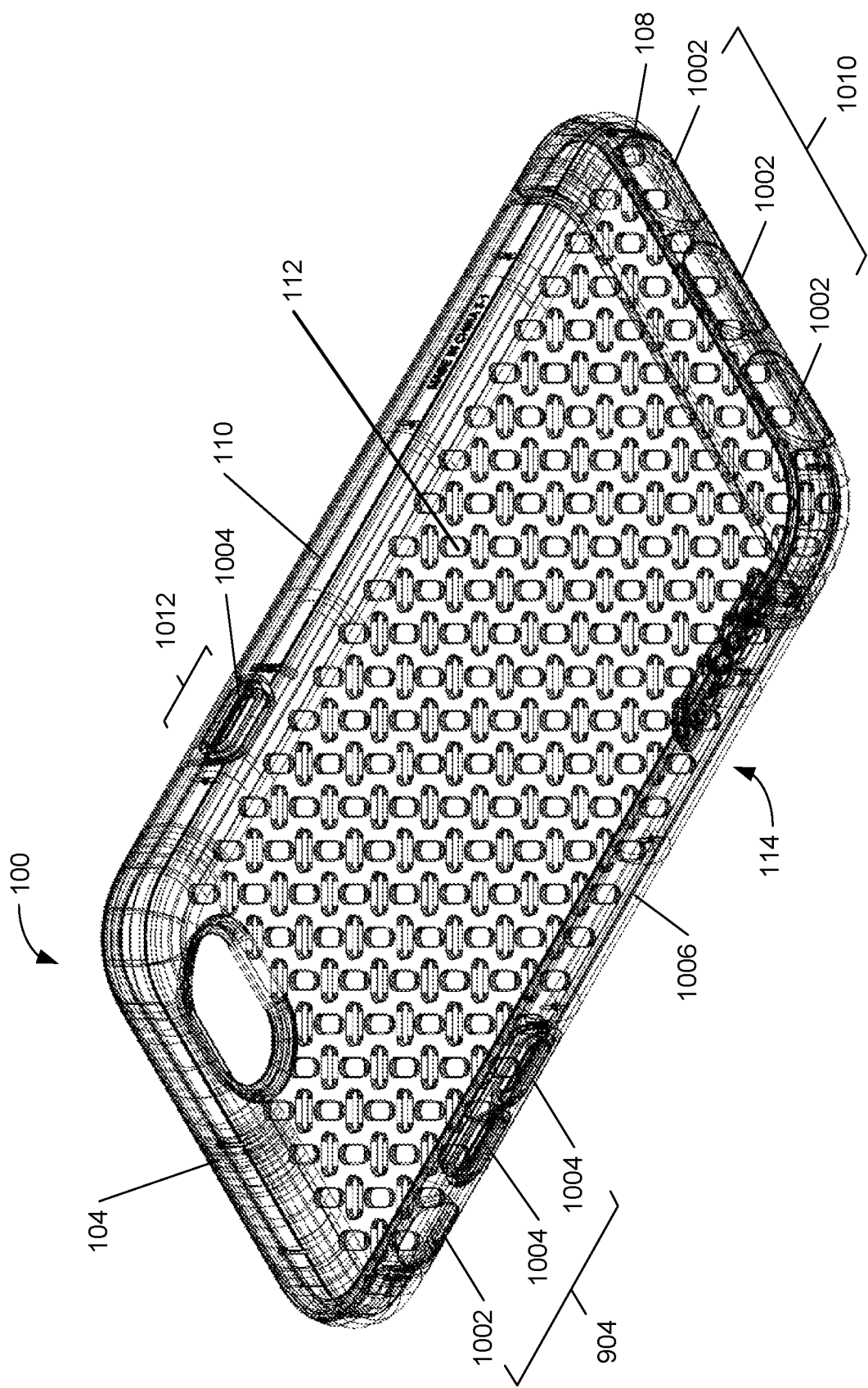
FIG. 10 shows an embodiment of the case with one or more holes in the sidewalls to allow a user access to the controls or ports while the electronic device is in the case.

FIG. 10 shows an embodiment of the case with one or more holes 1002 in the sidewalls to allow a user access to the controls or ports while an electronic device is in the case. The case may also include one or more protrusions 1004 on a sidewall that is adjacent to a button of the electronic device. When the user presses the protrusion, the protrusion pushes on the button, thereby activating the function controlled by the button. With the protrusion, the button may be used while it is within the case and is not exposed.

A section of a sidewall that includes a protrusion or a hole may have a composition of mostly (or more than 50 percent) thermoplastic polyurethane. For example, section 904 of the second sidewall includes hole 1002 and protrusions 1004 and has a composition of approximately 100 percent thermoplastic polyurethane, section 1010 of the third sidewall includes hole 1002 and has a composition of approximately 100 percent thermoplastic polyurethane, and section 1012 of the fourth sidewall includes hole 1002 and protrusions 1004 and has a composition of approximately 100 percent thermoplastic polyurethane.

Figure 11:
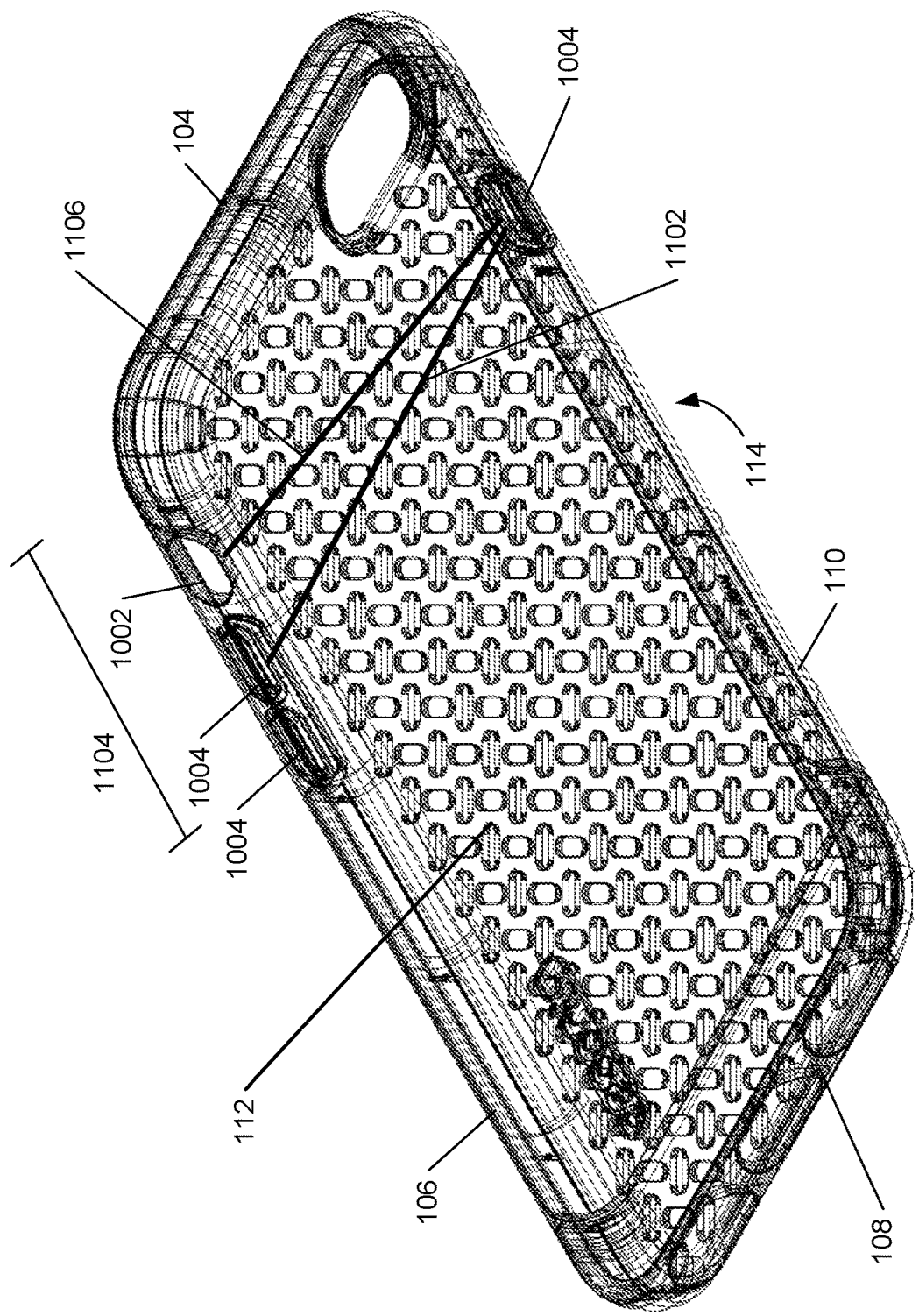
FIG. 11 shows an embodiment of the case shown in FIG. 1 with lines of increased flexibility between protrusions and holes across the base.

FIG. 11 shows an illustration of lines of increased flexibility between protrusions and holes across the base of case 100. When two areas of a case are more flexible and positioned in proximity to each other, a more rigid area of the case that is positioned between the two more flexible areas becomes more flexible.

In case 100, the increased flexibility of a rigid layer of the base are created by protrusions and holes made of more flexible materials that are positioned approximately opposite each other across the base. For example, a protrusion (any of the two protrusions) on the second sidewall is approximately opposite to (i.e., across the base from) the protrusion on the fourth sidewall. A hole on the second sidewall is also approximately opposite to (i.e., across the base from) the protrusion on the fourth sidewall.

A line of increased flexibility shows an example of an axis of rotation for bending the rigid layer of the base. The line extends across the base and between protrusions, holes, or any combination of these and may act as a hinge (or axis of rotation). For example, a line 1102 extends from a protrusion (any of the two protrusions) on the second sidewall to the protrusion on the fourth sidewall. Line 1102 is approximately a distance 1104 of 30 millimeters to 40 millimeters from the first sidewall. The distance may vary depending on the distances apart between protrusions, holes, or any combinations of these. In another example, a line 1106 extends from a hole 1102 on the second sidewall to protrusion 1004 on the fourth sidewall. The user may be able to more easily bend or flex the case about lines 1102 and 1106, acting like a hinge. When the protrusions and holes are made of a softer material, the user may be able to bend the case about the line more readily.

In addition to lines of increased flexibility that extend between more flexible areas on opposite sidewalls, lines of increased flexibility may also extend between more flexible areas on adjacent sidewalls or on opposite corners.

FIG. 12A shows an embodiment 1200 of the disclosed case with a channel 1202 that divides the outer layer into two pieces, upper portion 1208 and lower portion 1210. The upper portion has a greater area than the lower portion. The channel (or groove) is filled with the inner layer material, which extends from the inner layer toward the outer surface of the outer layer to fill the channel. The inner layer material is flush with the outer surface of the outer layer.

Use of an elastic inner layer to split the hard outer layer into two portions increases the flexibility of the case. Because the case is easier to flex, a user may more easily insert a device into the case without breaking the case.

In other embodiments, the upper portion has a smaller area than the lower portion so that the case can be flexed at a different position when inserting an electronic device into the case.

A length 1204 of the channel may extend from one sidewall to an opposite sidewall. For example, FIG. 12A shows embodiment where the length of the channel extends from the second sidewall to the fourth sidewall. In other embodiments, the length of the channel may extend from the first sidewall to the third sidewall, across the base between sidewalls (e.g., from one sidewall to an adjacent sidewall), corners (e.g., from one corner to an opposite corner), or any combination of the foregoing. In other embodiments, the channel may extend from a sidewall and terminate at an intermediate point before reaching an opposite sidewall. In specific embodiments, the length may be approximately 5, 6, 7, 8, 10, 15, 20, or 30 centimeters. In other embodiments, the channel may extend from a first distance from a sidewall and terminate at a second distance from the sidewall.

The channel may have a thickness 1206 that is approximately 1 or 2 millimeters. Alternatively, the channel may be thicker, such as 3, 4, 5, or 6 millimeters. A thicker channel may increase flexibility of the case. With increased flexibility of the case, a user may be able to insert a device into the case more easily. In other embodiments, the channel may be thinner, such as 0.3, 0.5, or 0.7 millimeters, which may decrease flexibility of the case. A less flexible case may prevent an electronic device from slipping out of the case when secured therein.

FIG. 12B shows an electronic device, specifically a smartphone, that may fit into the case shown in FIG. 12A. A line 1215 shows an approximate boundary line between a glass assembly 1216 and a frame 1218 of the phone, which includes a home button 1220. The channel in the case is placed at a position that aligns with the boundary line. For example, a top edge or bottom of the channel will be aligned with the boundary The channel may assist a user in orienting the case when placing the phone in the case. The channel is visible to the user from the front and the back side of the case. The channel may be seen at the sidewalls of the case, and is visible from the front of the case. The channel is also visible across the back of the case. In the embodiment shown in FIG. 12A, the channel is closer to the bottom sidewall of the case, matching with line 1215 of the phone. To place the phone in the correct orientation relative to the case, the user may place the phone into the case such that the channel lines up to line 1215.

FIG. 13A shows a cross section of the base that includes the channel. A depth 1302 extends from an outer surface 1304 of the second (or outer or exterior) layer and terminates before reaching an inner surface 1306 of the second layer. In other embodiments, the depth of the channel may extend completely through the second layer. In FIG. 13A, the cross-sectional shape of the channel is rectangular, and one dimension of the rectangle is equal to depth 1302.

In other embodiments, the case includes a back portion of the outer or exterior layer (e.g., polycarbonate or PC) and a left sidewall (or left side portion) of the outer layer. The left sidewall is connected to the back side portion at a first edge of the back portion. The case includes a right sidewall (or right side portion) of the outer layer. The right sidewall is connected to the back side portion at a second edge of the back portion. The second edge is opposite to the first edge.

The case also includes a groove (or channel) formed in the outer layer in the back portion, where the groove extends from the outer (or exterior) surface 1304 of the outer layer toward the inner or (interior) surface 1306 of the outer layer a first depth 1302 at a groove bottom surface 1307, where the first depth is less than a thickness of the outer layer from the exterior surface to the interior surface, and the groove has a first width 1310.

In a specific embodiment, the groove has walls that are transverse or vertical relative to a surface of the outer layer, and a bottom surface of the groove is parallel to the surface of the outer layer. However, in other embodiments, the groove may have walls that are angled differently with respect to the surface of the outer layer or the bottom groove surface.

FIGS. 13B-13E show various embodiments of the channel. For example, FIG. 13B shows a channel with a trapezoidal cross-sectional shape. FIG. 13C shows an inverted trapezoid shape. FIG. 13D shows a partial oval. FIG. 13E shows a rectangle with rounded corners. The sizes of the shapes or dimensions (e.g., depth 1302) may be adjusted to increase or decrease flexibility. In other embodiments, the channel may be V shaped, U shaped, semicircular, or another shape. The angle of the walls of the groove relative to the surface of the outer layer may be, for example, 95, 100, 120, 135, or 150 degrees, or other angles. This would also apply to the openings adjacent to the groove (discussed below).

Figure 14:
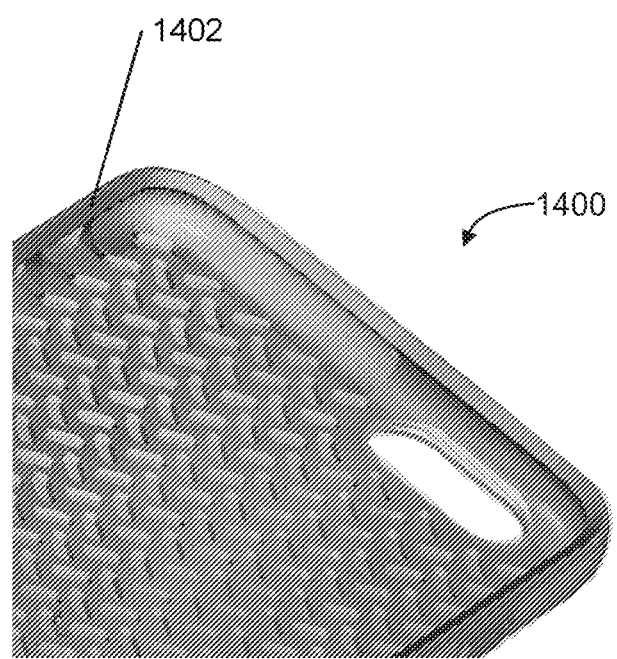
FIG. 14 shows an embodiment of the case that includes a projecting edge connected to at least a portion of a sidewall.

FIG. 14 shows an embodiment 1400 of the case that includes a projecting edge 1402 connected to at least a portion of a sidewall. The projecting edge extends from an outer edge 1502 of the fourth sidewall towards an interior space 1504 of the case. The interior space is defined by the base, and first, second, third, and fourth sidewalls. An electronic device is placed into the interior space of the case. The projecting edge helps hold the electronic device in the case and prevents the electronic device from slipping out of the case. The projecting edge may also be connected to the first, second, or third sidewalls, or any combination thereof.

Figure 15:
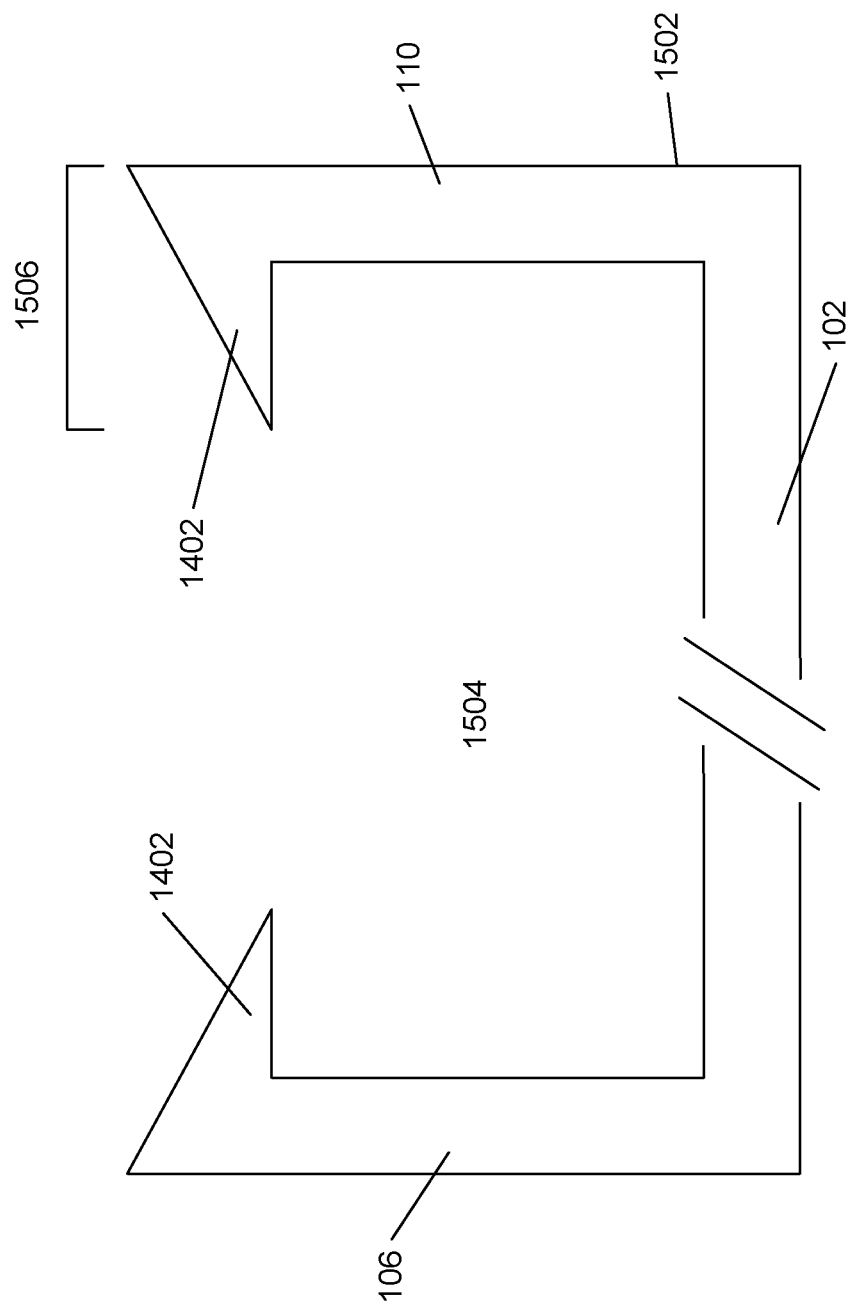
FIG. 15 shows a cross-sectional view of an embodiment of the projecting edge.

FIG. 15 shows a cross-sectional view of the projecting edge. The projecting edge extends a distance 1506 from the outer edge into the interior space. The two parallel diagonal lines show that a length of the base layer from sidewall 106 to sidewall 110 may be longer. The length of the base layer has been shortened in order to highlight other features in FIG. 15. In a specific embodiment, the distance is 1 millimeter. In other embodiments, the distance is greater, such as 1.5, 2, 2.5, 3, or 4 millimeters. Greater distances allow the case to have a more secure hold on the electronic device. In other embodiments, the distance is smaller, such as 0.1, 0.3, 0.5, or 0.7 millimeters. Smaller distances allow the user to have access to a greater area of the screen of the electronic device.

FIG. 15 shows sidewalls 106 and 110 as straight walls on the inner and outer layer. In other embodiments, the inner layer of sidewalls 106 and 110 are curved to hug against the curves of the electronic device. The outer layer may also be curved. The inner or outer or both layers of sidewalls 104 and 108 may also be curved to fit close tothe curves of the device.

Figure 16:
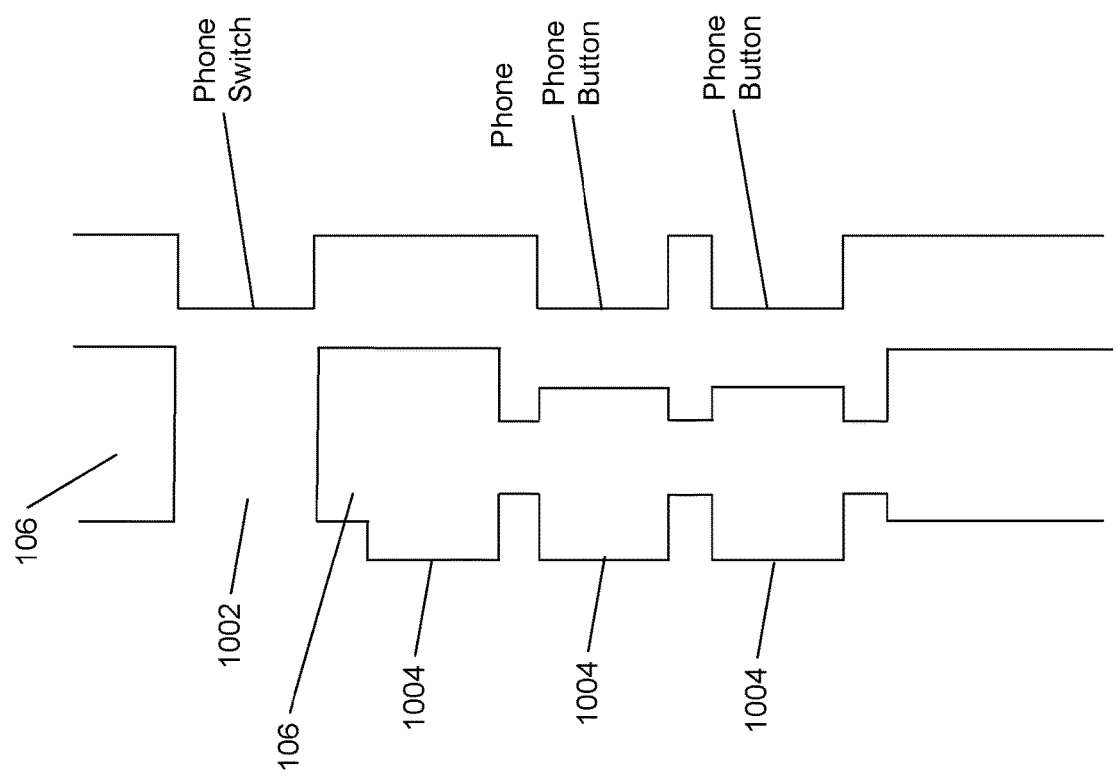
FIG. 16 shows a cross-sectional view of a portion of an embodiment of the second sidewall that includes protrusions and holes lined up next to a portable electronic device's buttons and features.
Figure 17:
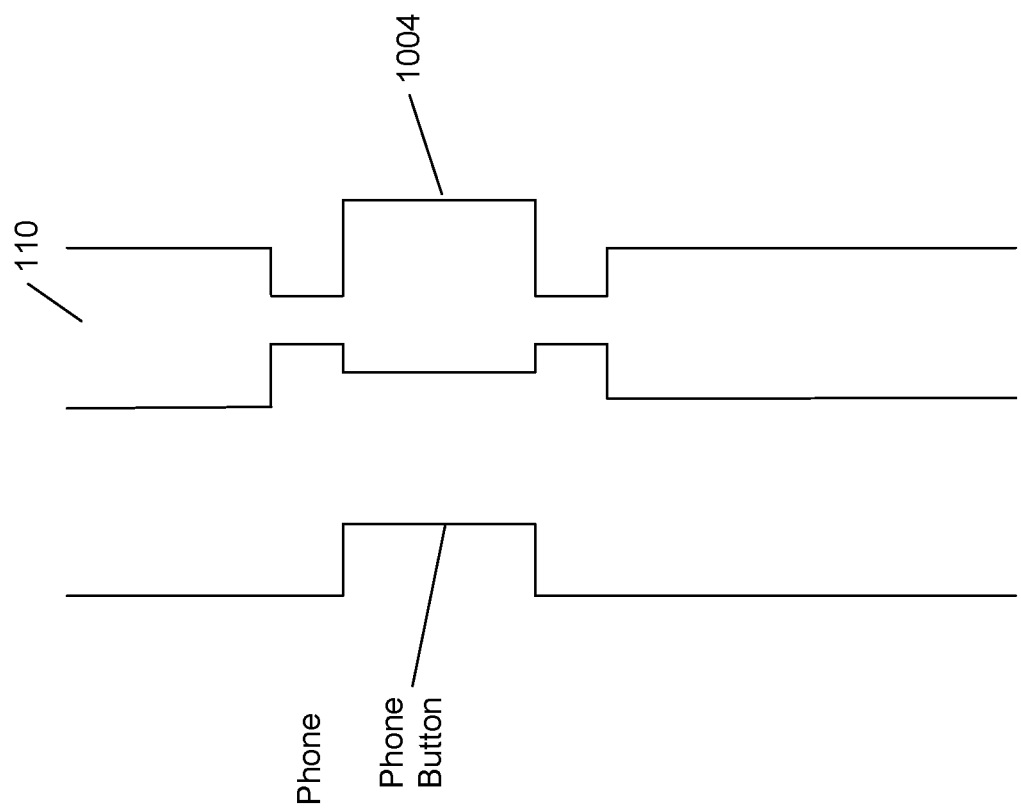
FIG. 17 shows a cross-sectional view of a portion of an embodiment of the fourth sidewall that includes a protrusion lined up next to a portable electronic device's button.
Figure 18:
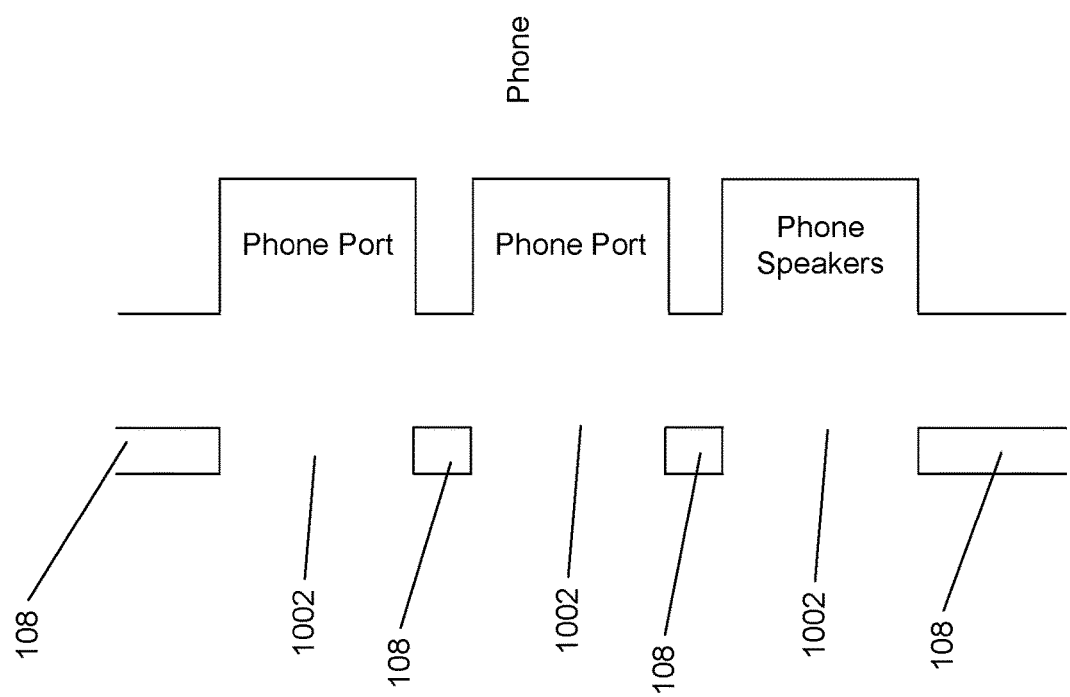
FIG. 18 shows a cross-sectional view of a portion of an embodiment of the third sidewall that includes holes that allows access to a portable electronic device's ports.

FIG. 16 shows a cross-sectional view (with a cutting plane 16-16 as labeled in FIG. 5) of a portion of the second sidewall that includes protrusions and holes lined up next to a smartphone's buttons and features. An interior surface of the protrusion (e.g., a portion that lines up along the phone button) is recessed relative to a portion of the surrounding interior surfaces of the sidewall, which contact the perimeter of the phone when the phone is inside the case and do not include protruding buttons or switches. The recessed area prevents the protrusions of the case from pressing on the phone buttons too hard. Because of the recessed area, a light touch on an exterior surface of the protrusion would not cause the button to be pressed and activated. FIG. 17 shows a cross-sectional view (with a cutting plane 17-17 as labeled in FIG. 5) of a portion of the fourth sidewall that includes a protrusion lined up next to a smartphone button. FIG. 17 also includes a recessed area that lines up along the phone button when the phone is placed inside the case. FIG. 18 shows a cross-sectional view (with a cutting plane 18-18 as labeled in FIG. 3) of a portion of the third sidewall that includes holes that allows access to a smartphone's ports or other features without having to take the smartphone out of the case.

Figure 19:
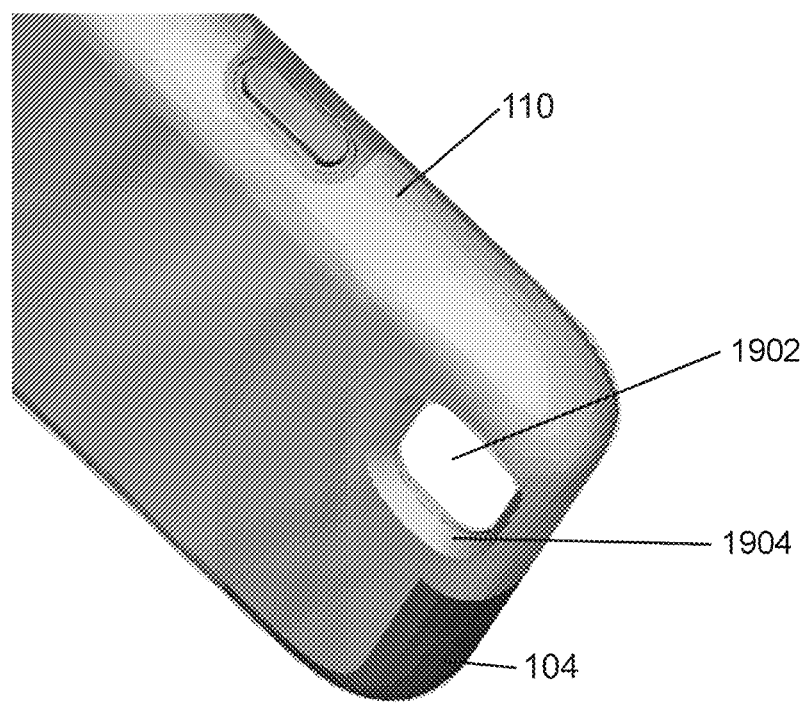
FIG. 19 shows an embodiment of the case with a camera opening.

FIG. 19 shows an embodiment of a case with a camera opening. A feature of some smartphones or other electronic devices is a camera with flash. The base of the case may include a single opening 1902 for both the camera lens and flash of the phone. When using the flash to take a picture or video, glare may be introduced into the picture or video as a result of light bouncing off a white or glossy surface. To reduce the glare, the base may include a dark colored or black camera ring connected to the camera opening. Additional details regarding the camera ring are described in U.S. patent application Ser. No. 13/185,200, filed on Jul. 18, 2011, which is hereby incorporated herein by reference. In some embodiments, the camera ring is made of polycarbonate. The camera ring is attached to the base of the case mechanically (e.g., via fasteners, rivets, or snap fits) or through adhesion.

The case may have different colors and color schemes. The first layer may have a first color. The second layer may have a second color. The projecting edge may have a third color. The channel may have a fourth color. The holes and protrusions of the case that are adjacent to controls and ports of the electronic device may have a fifth color. In some embodiments, some of the colors (i.e., the first, second, third, fourth, and fifth colors) are the same. In other embodiments, all of the five colors are the same color. In other embodiments, all of the five colors are different colors. In a specific embodiment, the projecting edge, holes and protrusions, and the channel have the same color, which for example may be light blue, gray, silver, or pink. In another specific embodiment, the first and second layers have different colors. The inner layer may have a darker color than the outer layer so that darker color of the inner layer (and if present, a pattern of the inner layer) is visible through the outer layer. For example, the inner layer may be black and the outer layer may be a translucent gray. In other embodiments, the inner layer may have a lighter color than the outer layer. For example, the inner layer may be gray and the outer layer may be black. In other embodiments, the inner and outer layers may be pink or blue.

The dimensions of the case may vary to accommodate different sizes and dimensions of the electronic devices being held therein. Table A below lists some examples of approximate dimensions of phones that may be housed in the case.

TABLE A

| Product | Product Dimensions (mm) |
| --- | --- |
| Apple iPhone 7 Plus | 158.2 × 77.9 × 7.3 |
| Apple iPhone 7 | 138.2 × 67.1 × 7.1 |
| Apple iPhone 6s Plus | 158.2 × 77.9 × 7.3 |
| Apple iPhone 6s | 138.3 × 67.1 × 7.1 |
| Apple iPhone 6 Plus | 158.1 × 77.8 × 7.1 |
| Apple iPhone 6 | 138.1 × 67.0 × 6.9 |
| Apple iPhone 5s | 123.8 × 58.6 × 7.6 |

Figure 20:
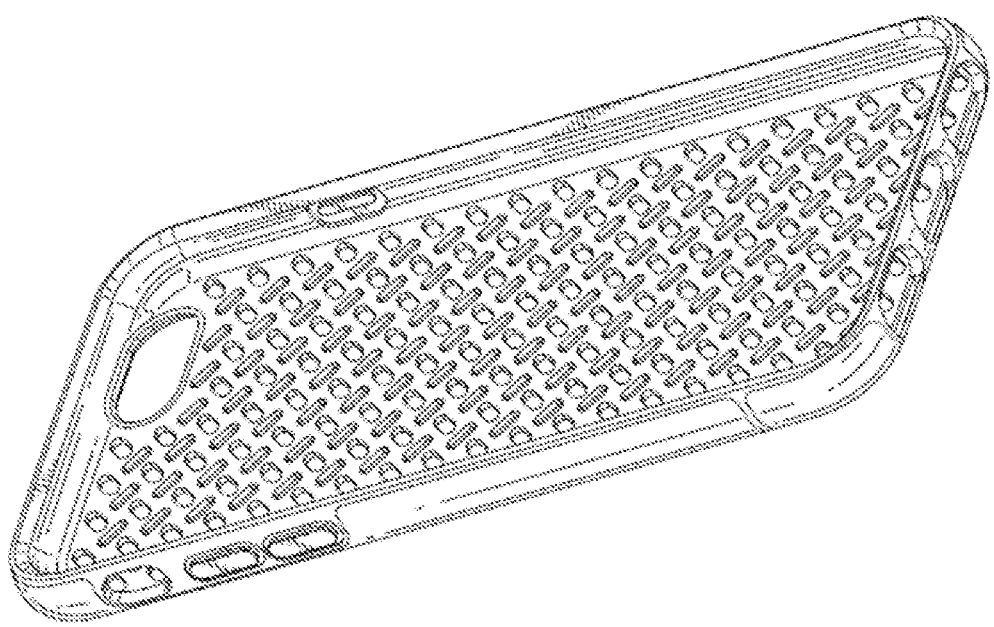
FIG. 20 shows a perspective view of an embodiment of the case.

The sidewalls may be higher than a depth of the electronic device. When a user places the electronic device encased in the case face down on a surface such that the screen faces the surface, the additional height of the sidewalls lifts the screen off the surface, preventing the screen from being scratched or dirtied. Alternatively, the sidewalls may have a raised bezel around the perimeter. FIG. 20 shows a perspective view of an embodiment of the case.

Figure 21:
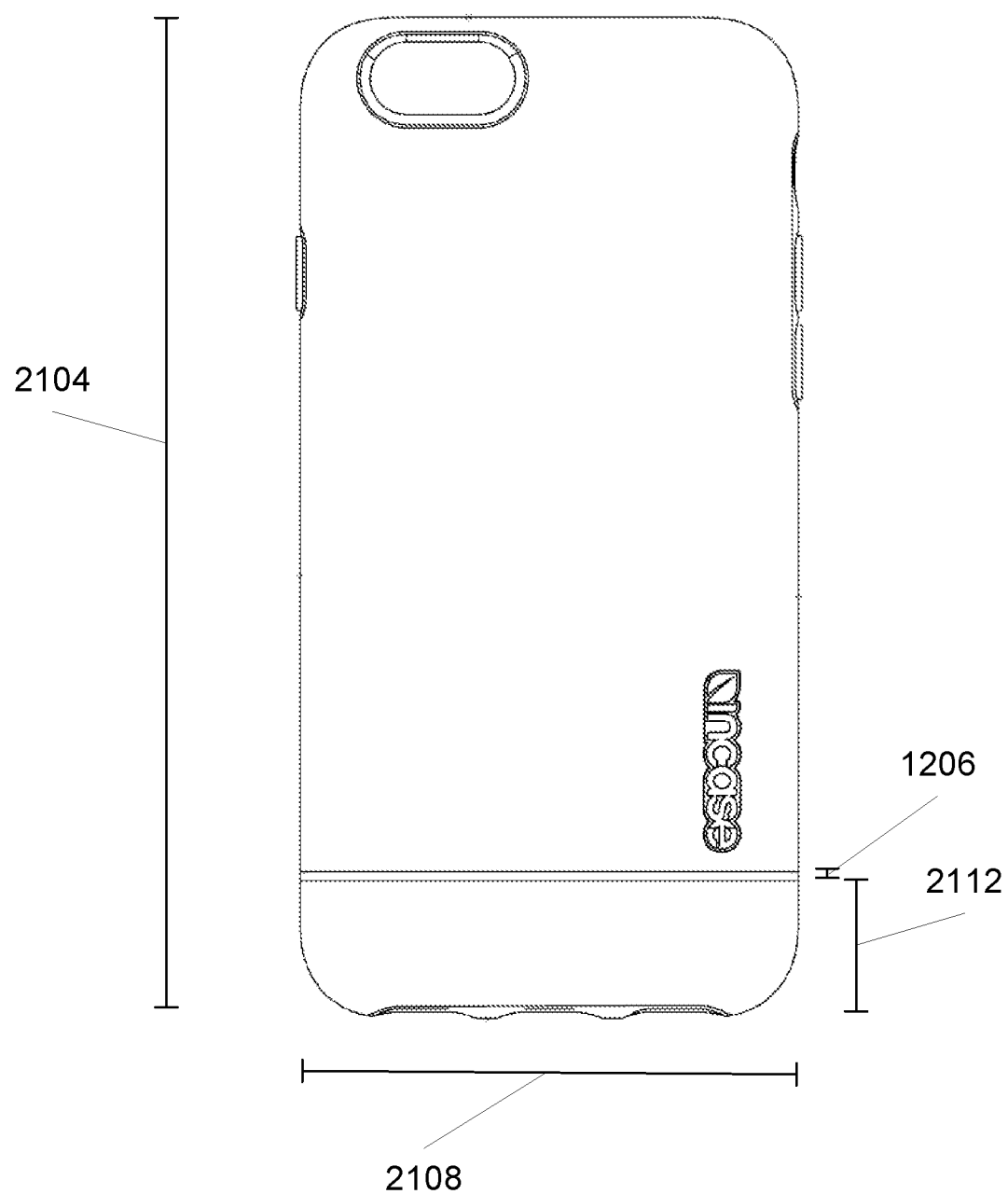
FIG. 21 shows an embodiment of the case.
Figure 22:
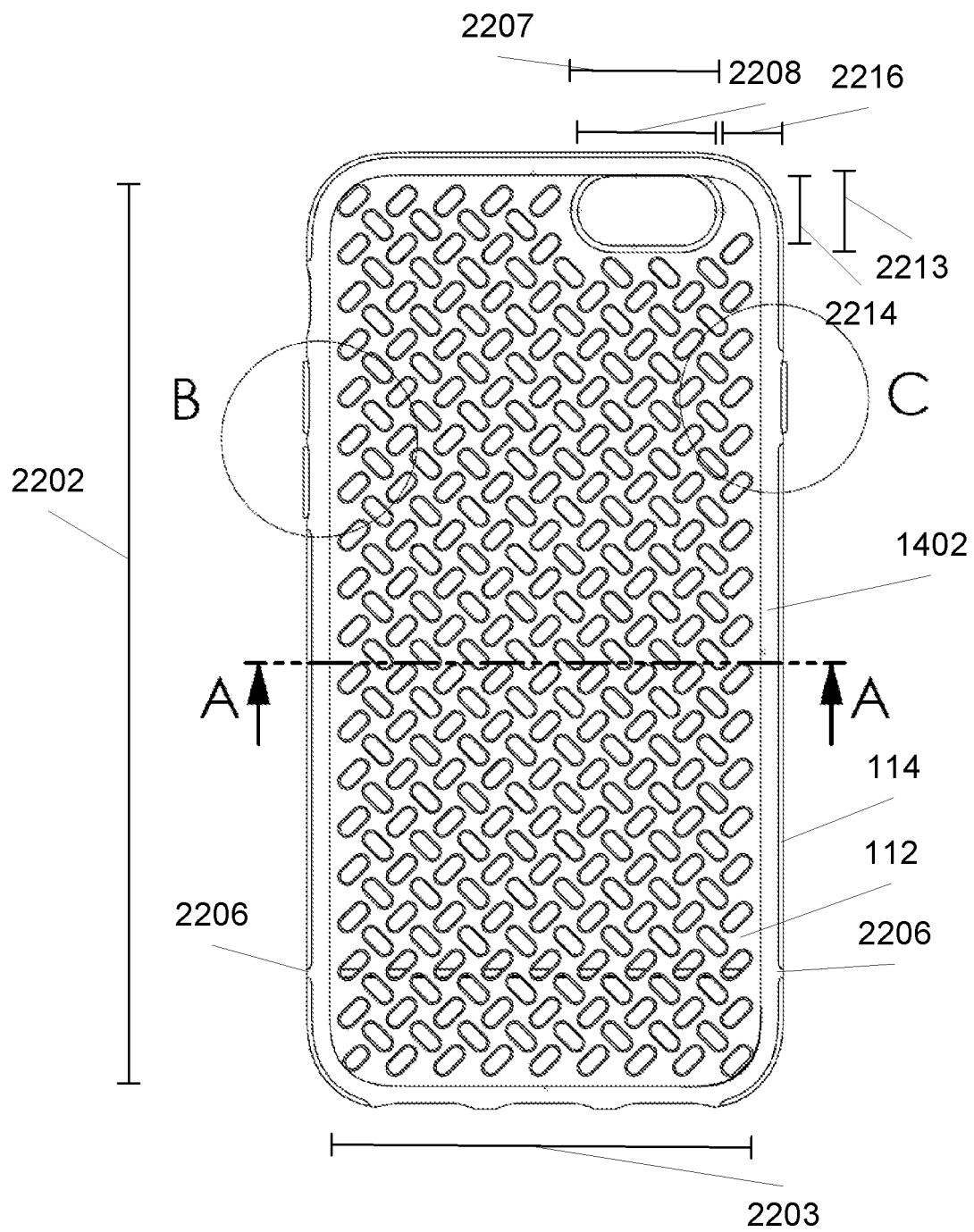
FIG. 22 shows a front view of the embodiment of the case shown in FIG. 21.
Figure 23:
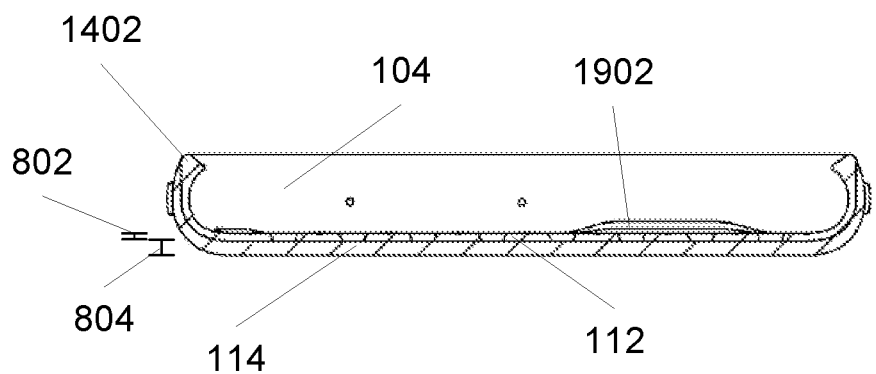
FIG. 23 shows a cross-sectional view A-A of the embodiment of the case shown in FIG. 22.
Figures 24, 25:
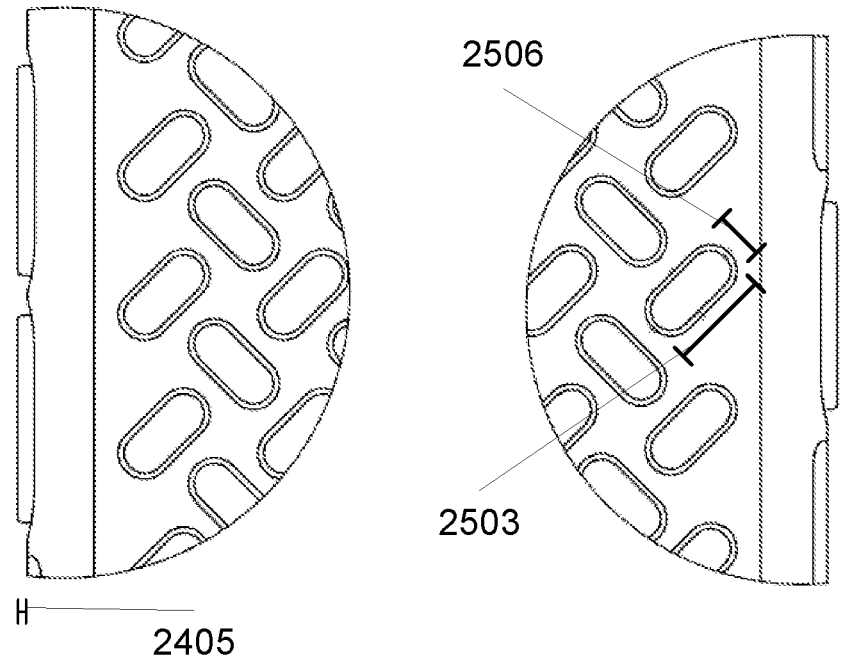
FIG. 24 shows an enlarged fragmentary view of buttons on the left sidewall of the embodiment of the case shown in FIG. 21.
FIG. 25 shows an enlarged fragmentary view of the buttons on the right sidewall of the embodiment of the case shown in FIG. 21.
Figure 26:
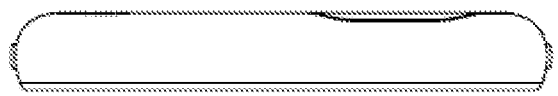
FIG. 26 shows a top view of the embodiment of the case shown in FIG. 21.
Figure 27:
FIG. 27 shows a left side view of the embodiment of the case shown in FIG. 21.
Figure 28:
FIG. 28 shows a right side view of the embodiment of the case shown in FIG. 21.
Figure 29:
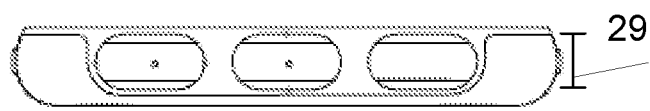
FIG. 29 shows a bottom view of the embodiment of the case shown in FIG. 21.

FIGS. 21-29 show an embodiment of the disclosed case configured for an iPhone 6S. FIG. 21 shows a back view of the case. FIG. 22 shows a front view of the case. FIG. 23 shows a cross-sectional view A-A of the case in FIG. 22. FIG. 24 shows an enlarged fragmentary view of buttons on the left sidewall of the case. FIG. 25 shows an enlarged fragmentary view of the buttons on the right sidewall of the case. FIG. 26 shows a top view of the case. FIG. 27 shows a left side view of the case. FIG. 28 shows a right side view of the case. FIG. 29 shows a bottom view of the case.

FIG. 21 shows an embodiment of the disclosed case that is generally rectangular with top, bottom, left, and right sidewalls. The top sidewall is joined to the left and right sidewalls with rounded corners. The bottom sidewall is joined to the left and right sidewalls with rounded corners. The case has a length 2104 extending from the top sidewall to the bottom sidewall and a width 2108 extending from left sidewall to right sidewall. The channel of the case has a thickness 1206 of 1.3 millimeters.

The channel is positioned at a distance 2112 from the bottom sidewall. In the embodiment shown in FIG. 21, the channel is about 0.65 millimeters from the bottom sidewall. The position of the channel at this distance from the bottom sidewall allows a user to flex the case at that position and readily insert an electronic device into the case. It is more difficult to flex areas of the case that are closer to the perimeter of the case or closer to the sidewalls of the case. When inserting an electronic device into the case, the user typically inserts one end of the electronic device into the case first and then the second, or opposite, end. Being able to flex one end of the case or a sidewall in order to wrap the case around the second end makes the insertion process easier and less frustrating. Therefore, a channel close to a sidewall (e.g., the bottom sidewall) of the case makes the insertion process easier. In the embodiment shown, the ratio of distance 2112 to length 2104 of the case is 19.65/141.64 or 0.139. The ratio may be smaller, such as 0.13, 0.12, 0.11, 0.10, 0.09, or even smaller. A smaller ratio signifies less flexibility at the position of the channel, which may be more desirable because the electronic device is held more securely within the case. The ratio may also be larger, such as 0.14, 0.15, 0.16, 0.18, 0.20, 0.3, 0.35, 0.4, 0.45, or even larger. A larger ratio places the channel farther from a sidewall, which increases flexibility of the case at the channel. The increased flexibility may be desirable because the electronic device may be inserted more easily into the case. A ratio of 0.5 would place the channel at the position midway between top and bottom sidewalls of the case, which provides a significant amount of flexibility.

FIG. 22 shows a front view of case. The front view shows the inner layer 112 of the base and the first, second, third, and fourth sidewalls that are joined to the base. The portions of the sidewalls visible in this front view are the outer layer 114 of the sidewalls and the projecting edge 1402. The inner layer of the sidewalls is underneath projecting edge 1402 and is not shown in this view. Projecting edge 1402 is connected to the sidewalls and extends into the interior space 1504 of the case. When an electronic device is placed inside the case, the projecting edge overlaps the edges of the electronic device and holds the electronic device in place.

In the embodiment shown in FIG. 22, the distance that the projecting edge extends into the interior space of the case is 3.045 millimeters. The distance may be more, such as 4, 5, 6, or more millimeters, so that the electronic device may be clasped more securely to the case. The distance may alternatively be less, such as 3, 2, 1, or 0.5 millimeters, so that the screen of the electronic device is less obstructed by the projecting edge.

In the embodiment shown in FIG. 22, the projecting edge is made of the same material as the inner layer. In other embodiments, the projecting edge may be made of the same material as the outer layer or have dual layers, similar to the base of the case.

At the channel, the case has one layer of material, instead of two layers. FIG. 22 shows that the outer edges 2206 of the case where the channel is located do not have the same material as outer layer 114. The channel is made from the inner layer material and the inner layer material extends all the way through to the outer layer and lies flush with the outer layer material. In other embodiments, a surface of the inner layer is below the surface of the outer layer. In other embodiments, one or more portions of the surface of the inner layer are above the surface of the outer layer.

Other portions of the case are made of one layer of material, instead of two layers, including the buttons and holes.

FIG. 23 shows a cross section of the case facing towards the top sidewall. The outer layer material is present in the base and the sidewalls. The inner layer material is present in the base, sidewalls, and projecting edge 1402. The projecting edge has a negative slope as it extends from the outer edges of the case towards the interior of the case. The negative slope gives the effect of opening up the screen to a user so the user does not perceive the screen to be obstructed by the projecting edge. In other embodiments, the slope may be positive. With a positive slope, the projecting edge comes towards the interior of the case. A thicker projecting edge allows a user to have a better grip on the projecting edge in order to flex and peel the case off the electronic device.

FIG. 24 shows an enlarged fragmentary view of the buttons on the left sidewall. FIG. 25 shows an enlarged fragmentary view of the buttons on the right sidewall. FIG. 25 also shows the obround patterns with length 2503 and width 2506. In other embodiments, the pattern may be made with circles, ellipses, ovals, squares, triangles, or other geometric or arbitrary shapes or polygons.

FIG. 26 shows a top view of the case. FIG. 27 shows a left side view of the case. FIG. 28 shows a right side view of the case. FIG. 29 shows a bottom view of the case.

Figure 30:
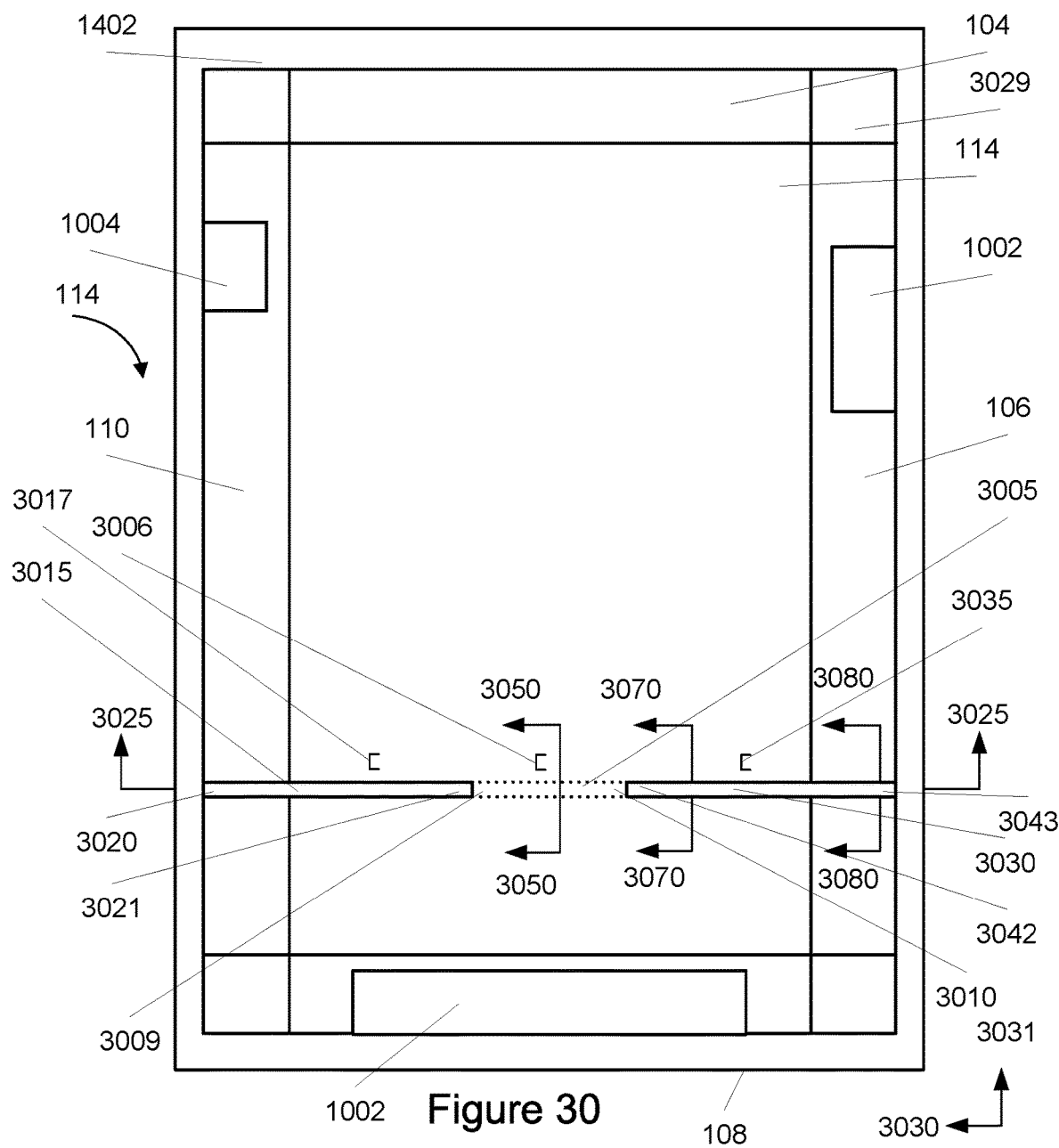
FIG. 30 shows a block diagram of a back view of an embodiment of the case.

FIG. 30 shows a block diagram of a back view of the case. In this view, the top, left, bottom, and right sidewalls have been flattened and spread out to be in the same plane as the base. Because this is a back view, the material of the base and sidewalls that is visible is the outer layer 114, which may be referred to as the polycarbonate (PC) layer. There are cutouts in the outer layer of the right, bottom, and left sidewalls. In an embodiment, the cutouts are filled with the same material (not shown in FIG. 30) of the inner layer (e.g., thermoplastic polyurethane or TPU) and form protrusions 1004 and holes 1002. The inner layer cannot be seen from this view. Projecting edge 1402 has also been flattened and spread out. In some embodiments, the cutouts are filled with a different material than the inner layer, but have greater elasticity than the outer layer (e.g., polycarbonate).

Although one groove or channel is shown in FIG. 30, an embodiment of the case may have multiple grooves, such as 2, 3, 4, 5, or more grooves. Typically, a case that has more grooves is more flexible. So for larger or more elongated devices, such as a tablet computer, the case may include two or more grooves. The construction will be similar to that described for a single groove. The grooves are oriented to run transverse to the longer sides of the case. However, in some embodiments, the grooves are oriented to run parallel to the longer sides of the case. In some embodiments, the grooves extend in multiple orientations and can crisscross.

The case includes a groove 3005 (shown in broken lines) formed in the outer layer in the back portion, where the groove extends from the exterior surface of the outer layer toward the interior surface of the outer layer a first depth at a groove bottom surface, where the first depth is less than a thickness of the outer layer from the exterior surface to the interior surface, and the groove has a first width 3006, the groove extends from a first end 3009 to a second end 3010, and first end is opposite to the second end.

The case may include a first opening 3015 formed in the outer layer in the back portion, where a second width 3017 of the first opening is the same as the first width, a second depth (shown in FIG. 31 as depth 3105) of the first opening extends from the exterior surface of the outer layer to the interior surface, the first opening comprises a third end 3020 and a fourth end 3021, and the third end is connected to the first end of the groove. In other embodiments, the first width is larger than the second width or smaller than the second width.

In an embodiment, the fourth end of the first opening is positioned in the right sidewall. In other embodiments, the fourth end may be positioned in the left, top, or bottom sidewalls. Alternatively, the fourth end may be positioned within the base portion of the case. In other embodiments, the fourth end may be positioned at a corner 3029 of the case.

The case may also include a second opening 3030 formed in the outer layer in the back portion, where a third width 3035 of the second opening is the same as first width, a second depth 3134 of the second opening extends from the surface of the outer layer to the interior surface, the third opening comprises a fifth end 3042 and a sixth end 3043, and the fifth end is connected to the second end of the groove. In other embodiments, the third width may be larger or smaller than the first width, or the third width may be larger or smaller than the second width. The second depth of the second opening may be larger or smaller than the first depth.

Opening 3015, opening 3030, and groove 3005 are arranged in a line. The material filling in the openings and deposited in the groove will appear as a line across the back of the case. The material may be referred to as an insert or filler, and may be made of a TPU or other polymer that has more flexibility or elasticity than the material of the outer layer. The filler or insert material may be the as the inner layer material, or it may be different. The insert or filler material may have an upper surface that is flush with the surface of the outer layer. In other embodiments, the upper surface may be below or above the surface of the outer layer. The upper surface may be tacky (or tackier) to give more grip than the surface of the outer layer.

FIG. 30 shows a groove positioned between two openings. In other embodiments, the groove may extend fully across the back and sides, and there are no openings. The groove may be absent, and the openings may instead merge into a single opening that extends across the back and sides. There may be one opening to one side of the groove. There may be multiple grooves, with an opening between each groove. In some embodiments, the openings on either side of the groove are the same width. The openings on either side of the groove may have a different width. The width of the groove is less than the sum of the widths of the two openings. In some embodiments, a midpoint of the groove is positioned midway between the two sidewalls of the case. But in other embodiments, the groove is positioned at a position between the two sidewalls of the case, but not midway between the sidewalls (e.g., at a position 10 percent, 25 percent, 30 percent, or 40 percent away from one sidewall in the direction of the adjacent sidewall).

A gap between the sidewalls of opening 3015 is a first distance. A gap between the sidewalls of groove 3005 is a second distance. A gap between the sidewalls of opening 3030 of the opening is a third distance. In some embodiments, the first distance, second distance, and third distance are the same, and the line going across the back and sides will have a uniform thickness. In some embodiments, these distances are different or vary. For example, the first distance may be the same as the third distance, but different from the second distance, where the first distance is greater than the second distance. The first distance may be the same as the third distance, but different from the second distance, where the first distance is less than the second distance. Each of the first, second, and third distances may be different. The first distance may be greater than the second distance which may be greater than the third distance. The first distance may be greater than the third distance which may be greater than the second distance. The second distance may be greater than the first distance which may be greater than the third distance.

FIG. 30 shows an embodiment where there are no openings or cutouts in the corner, which will be filled with the elastic insert or filler material (e.g., TPU). The flex allowed by the flex groove is sufficient to allow insertion of a device into the case without openings or cutouts in the corners. In other embodiments, holes or cutouts 1004 and 1002 are also absent, and one or more flex grooves will allow sufficient flex.

Figure 31:
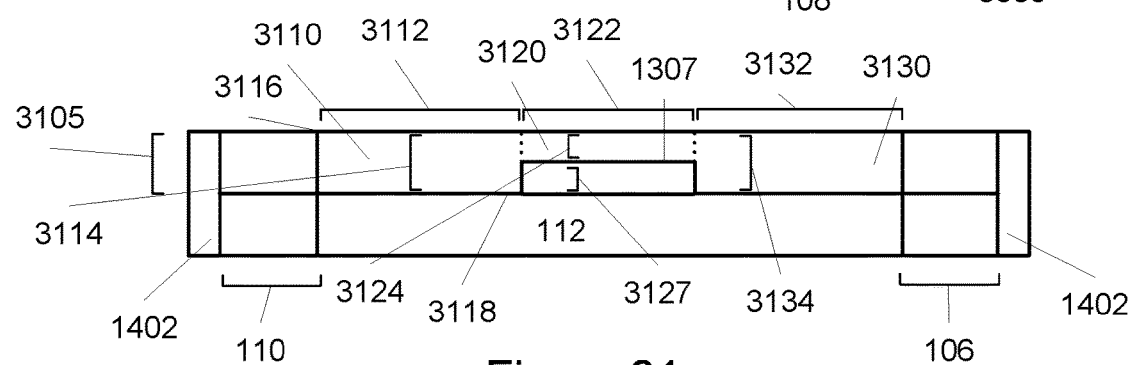
FIG. 31 shows an enlarged view of an embodiment of a cross section of the embodiment of the case shown in FIG. 30.

FIG. 31 shows an enlarged view of an embodiment of a cross section 3025-3025 of the case in FIG. 30. The cross-sectional view is along a first direction 3030, which extends between the left and right sidewalls.

The case may include a first portion 3110 of an insert 3111 made of a flexible material (e.g., TPU) formed in the first opening. The insert may be referred to as the TPU portion. The first portion of the insert comprises a fourth width 3112 that is the same as the second width and a thickness 3114 extending from at least the exterior surface of the outer layer 3116 to the interior surface 3118.

The case may also include a second portion 3120 of an insert formed in the groove. The second portion of the insert comprises a fifth width 3122 that is the same as the first width, and a thickness 3124 extending from at least the exterior surface of the outer layer to the groove bottom surface. In a specific embodiment, the groove bottom surface is partially between the exterior and interior surface of the outer layer, and thus the groove is partially through the outer layer. The remaining distance 3127 between the groove bottom surface and the interior surface of the outer layer is a polycarbonate material. In other embodiments, the groove extends all the way through the outer layer, so the groove bottom surface is at the interior surface of the outer layer.

The case may also include a third portion 3130 of an insert formed in the second opening, where the third portion of the insert comprises a sixth width 3132 that is the same as the third width and a thickness 3134 extending from at least the exterior surface of the outer layer to the interior surface.

Material for the first, second, and third portions may be the same or may be different with varying degrees of softness or flexibility. The material for the first, second, or third portions can be the same as the material for the inner layer, different from the material for the inner layer, or a composite of both.

In some embodiments, the insert may be flush with the exterior surface of the outer layer. In other embodiments, the insert may be uneven relative to the exterior surface of the outer layer. Further, the thicknesses of the insert for the first, second, or third portions may be the same or may be different from each other. For example, all of the first, second, and third portions may be flush with the exterior surface. Alternatively, the first and third portions are flush with the exterior surface, but the second portion is not.

In alternative embodiments, instead of a flexible material filling or partially filling the first opening, groove, or second opening, there may be no material at all. Filling or partially filling the first opening, groove, or second opening may aid in preventing dust or dirt from accumulating there. However, not filling the openings and grooves decreases the amount of material used to produce the case.

Figure 32A:
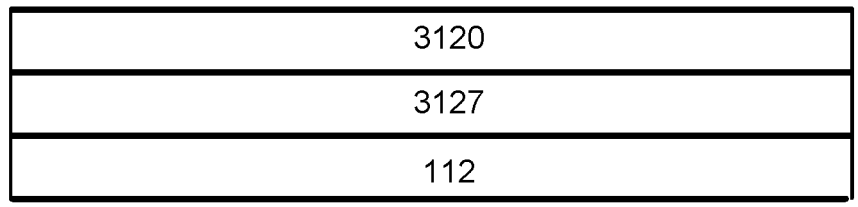
FIG. 32A shows cross-sectional view of a groove for an embodiment of the case.
Figure 32B:
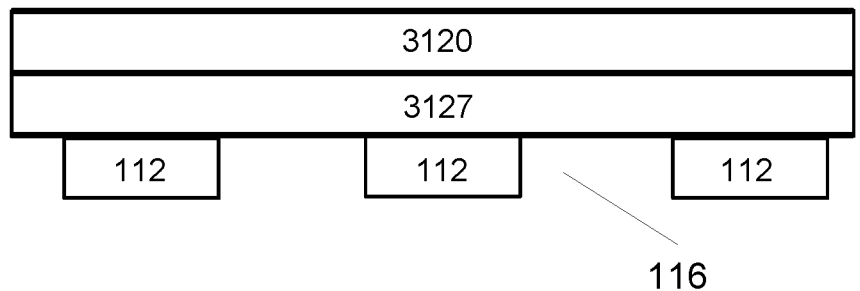
FIG. 32B shows cross-sectional view of the groove for an embodiment of the case including openings in the inner layer.

FIG. 32A shows cross-sectional view 3050-3050 of an embodiment of the groove in a second direction 3031, which is transverse to the first direction 3030, at a first distance from the left side wall. A top layer is made of inner layer material. Underneath is the middle portion, made of outer layer material. And underneath the middle portion is the inner layer. In this embodiment, the inner layer does not have openings or perforations. However, in FIG. 32B, the inner layer includes openings 116.

Figure 33A:
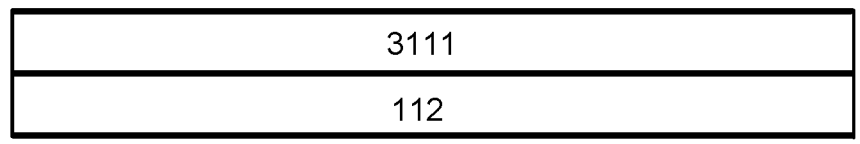
FIG. 33A shows cross-sectional view of the second opening for an embodiment of the case.
Figure 33B:
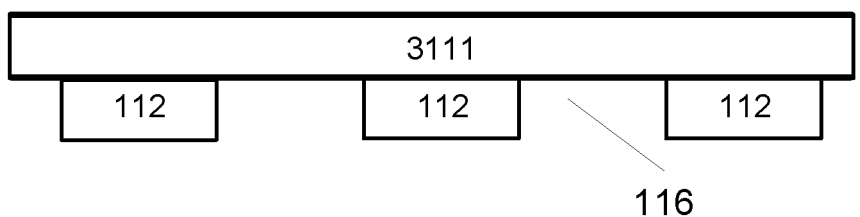
FIG. 33B shows cross-sectional view of the second opening for an embodiment of the case including openings in the inner layer.

FIG. 33A shows cross-sectional view 3070-3070 of an embodiment of the second opening in the exterior layer in a second direction 3031, which is transverse to the first direction 3030, at a second distance from the left sidewall. The second distance is closer to the left sidewall than the first distance and cross-sectional view is taken across section 3003. A cross-sectional view across section 3004 will be similar. A top layer is made of inner layer material. And underneath this layer is the inner layer. In this embodiment, the inner layer does not have openings or perforations. However, in FIG. 33B, the inner layer includes openings 116. Cross-sectional view 3080-3080 shows the second opening in the exterior layer of sidewall 106.

Figure 34:
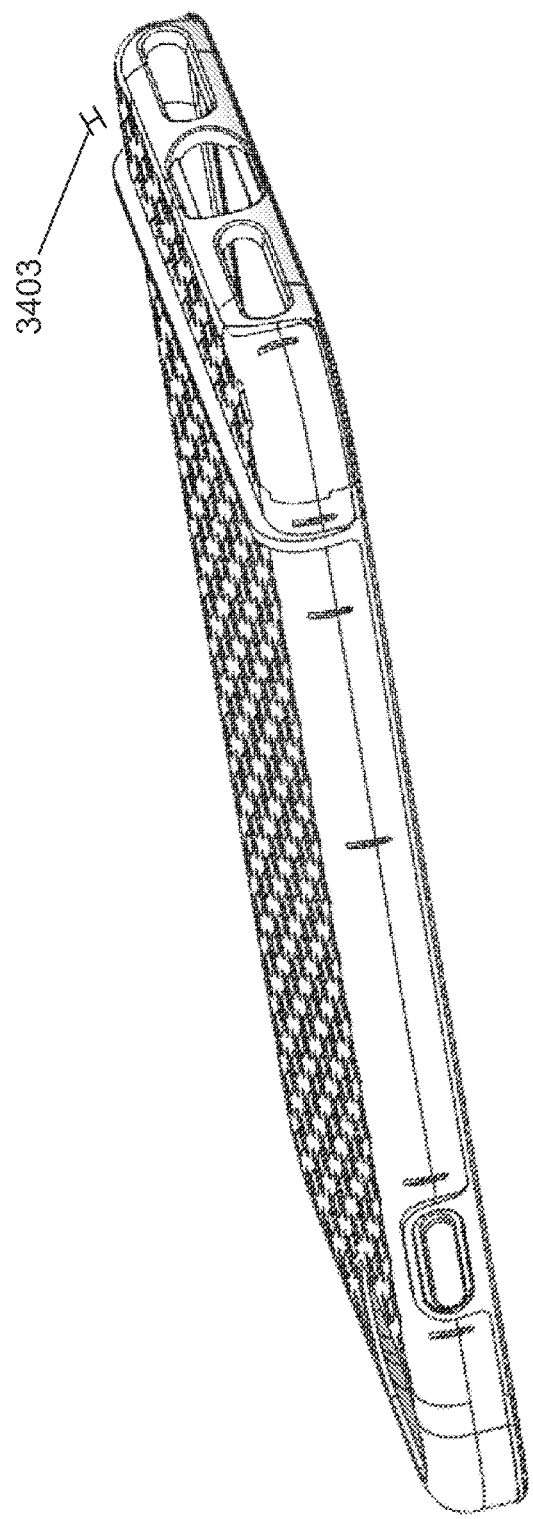
FIG. 34 shows a perspective view of an embodiment of the inner layer of the case.

FIG. 34 shows a perspective view of an embodiment of the inner layer of the case. The channel has a height 3403 relative to the base portion. In a specific embodiment, the height is 1.5 millimeters.

Figure 35:
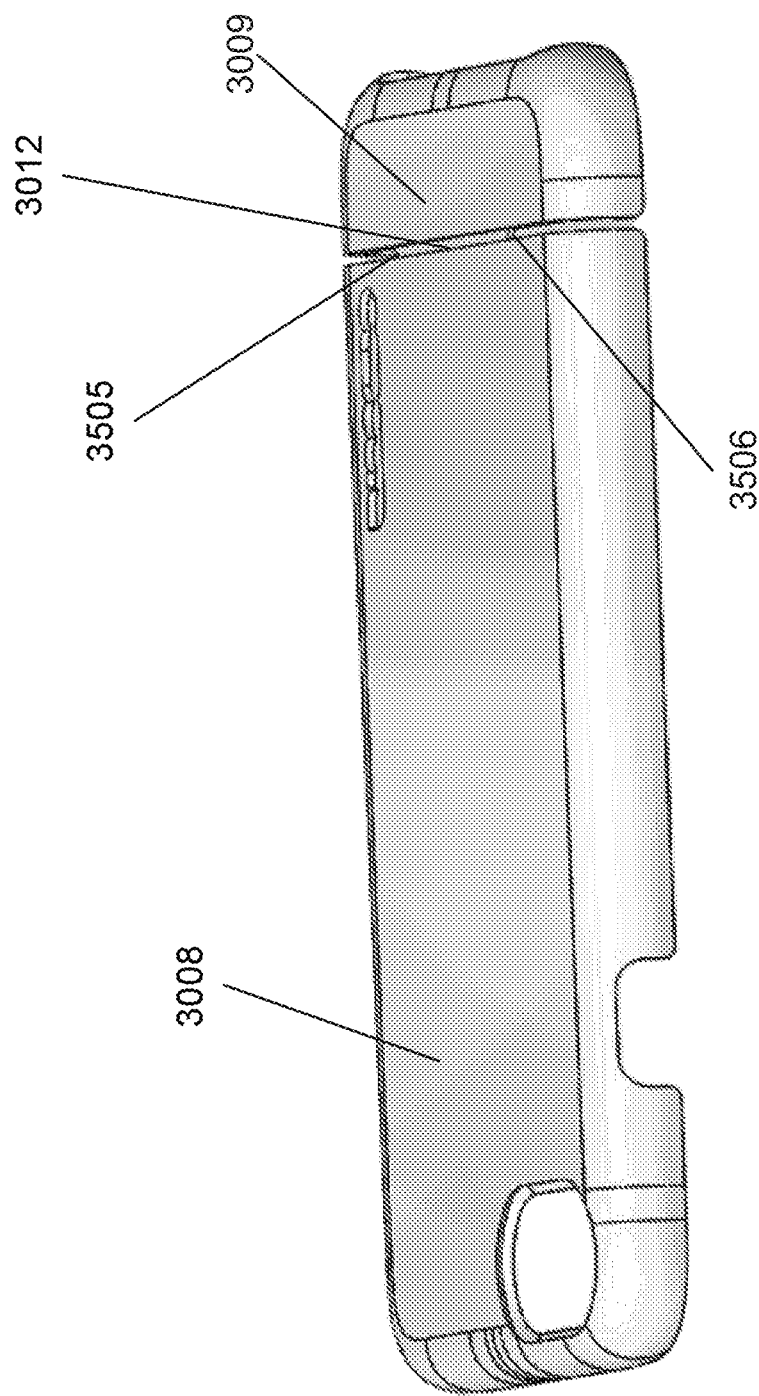
FIG. 35 shows perspective views of an embodiment of the outer layer of the case.

FIG. 35 shows perspective views of an embodiment of the outer layer of the case. The outer layer of the case is divided into two portions, upper 3008 and lower 3009 portions. The upper portion is connected to the lower portion by a middle portion 3012. The middle portion extends from a first distance 3505 from the left sidewall to a second distance 3506 from the left sidewall. In a specific embodiment, the middle portion has a thickness of 0.57 millimeters, which is thinner than the upper and lower portions of the outer layer which have thicknesses of about 1.5 millimeters to about 1.63 millimeters.

Figure 36:
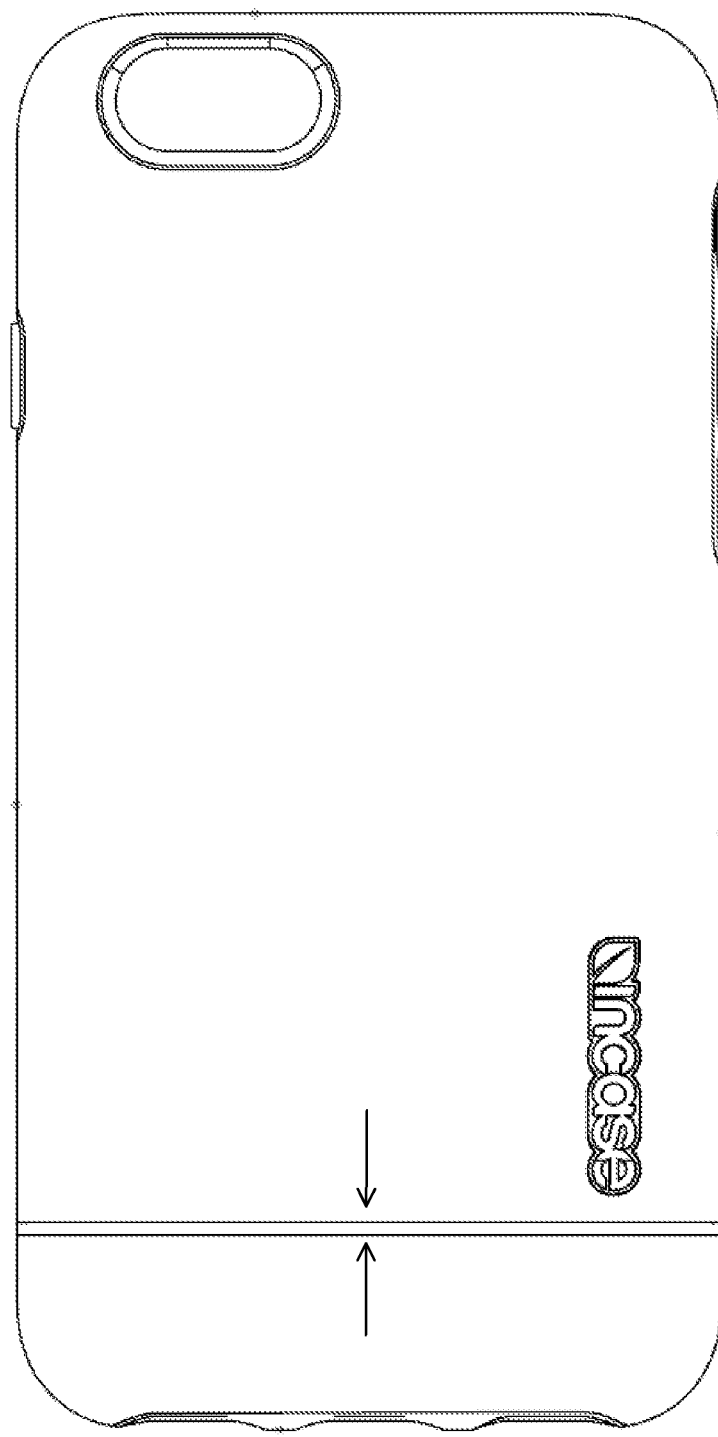
FIG. 36 shows a direction of movement of an embodiment of the channel (or groove) when a user flexes the case to insert the portable electronic device.

FIG. 36 shows a direction of movement of the channel (or groove) when a user flexes the case to insert the phone. Typically, a user inserts the phone into the case so an end (e.g., upper or lower shorter edges) is inserted into the case first while flexing the case. This slightly enlarges the front opening of the case to allow the phone to fit in the case. The flex groove or channel on the back and sides of the case allows the flexing. Specifically, in the back, the walls of the openings and groove are pushed toward each other, compressing the material in the openings and groove. When the flexing is stopped, the sidewalls return to their original positions and the material, due to its elastic property, returns to its original shape.

The dimensions of the case may be adjusted to fit various dimensions and sizes of different electronic devices. The electronic devices may also have different features. For example, there might be one less hole in a sidewall in the case because a button was no longer included in the design of an electronic device.

The present disclosure describes examples of embodiments with specific dimensions, measurements, and values. These are not intended to be exhaustive or to limit the invention to the precise form described. The dimensions or measurements are given in millimeters (or inches), radii of curvature are given in millimeters, and angles are given in degrees. The values are approximate values. These values can vary due to, for example, measurement or manufacturing variations or tolerances or other factors. For example, depending on the tightness of the manufacturing tolerances, the values may vary by plus or minus 5 percent, plus or minus 10 percent, plus or minus 15 percent, or plus or minus 20 percent.

Further, the measurements are for a specific embodiment of the device, and other embodiments may have different values, such as certain dimensions made larger for a larger-sized product, or smaller for a smaller-sized product. The apparatus may be made proportionally larger or smaller by adjusting relative measurements proportionally (e.g., maintaining the same or about the same ratio between different measurements). In various embodiments, the values may be the same as the value given, about the same of the value given, at least or greater than the value given, or may be at most or less than the value given, or any combination thereof.

Table B below shows dimensions for specific embodiments in millimeters of the case. It should be understood that the invention is not limited to the specific dimensions presented. The dimensions may be adjusted to be higher or lower for different features of the electronic device that the case is intended to protect. Further, the dimensions in other embodiments may not be exactly the same as the dimensions presented and may be modified or altered as appropriate for a particular application or based on the data or situation.

TABLE B

| Embodiments | Embodiment 1 (mm) | Embodiment 2 (mm) | Embodiment 3 (mm) | Embodiment 4 (mm) |
| --- | --- | --- | --- | --- |
| Length of case 2104 | 141.64 | 161.57 | 142.04 | 161.65 |
| Width of case 2108 | 70.47 | 81.27 | 70.87 | 81.41 |
| Length between inner borders of projecting edge 2202 | 135.39 | 154.72 | 136.07 | 155.09 |

TABLE B-continued

| Embodiments | Embodiment 1 (mm) | Embodiment 2 (mm) | Embodiment 3 (mm) | Embodiment 4 (mm) |
|---|---|---|---|---|
| Width between inner borders of projecting edge 2203 | 64.38 | 74.61 | 64.42 | 74.58 |
| Length of outer borders of camera ring 2207 | 22.50 | 22.75 | 26.1 | 37.50 |
| Length of inner borders of camera ring 2208 | 20.50 | 21.75 | 24.4 | 34.67 |
| Width of outer borders of camera ring 2213 | 12.5 | 10.45 | 25.9 | 35.7 |
| Width of inner borders of camera ring 2214 | 10.30 | 9.45 | 12 | 12 |
| Distance of camera ring from right sidewall 2216 | 8.91 | 10.55 | 6.25 | 6.25 |
| Thickness of inner layer 802 | 0.86 | 0.83 | 0.86 | 0.83 |
| Thickness of outer layer 804 | 1.63 | 1.50 | 1.63 | 1.50 |
| Protruding height of buttons 2405 | 0.50 | 0.50 | 0.50 | 0.50 |
| Length of obround opening in inner layer 2503 | 5.48 | 4.83 | 4.71 | 4.71 |
| Width of obround opening in inner layer 2506 | 2.69 | 2 | 1.88 | 1.88 |
| Height of a polycarbonate portion of a sidewall 2805 | 10.22 | 10.64 | 10.79 | 10.87 |
| Length of a hole in a sidewall 2905 | 14.31 | 12.43 (a first hole) 15.72 (a second hole) 19.58 (a third hole) | 13.9 | 15.96 |
| Width of a hole in a sidewall 2906 | 7.42 | 7.41 (for all holes) | 2.6 | 3.0 |
| Width of channel 1206 | 1.3 | 1.25 | 1.3 | 1.25 |
| Distance of channel from bottom sidewall 2112 | 19.65 | 21.12 | 19.65 | 21.12 |
| Thickness of projecting edge | 3.045 | 3.33 | 3.225 | 3.415 |

A method of making a case for an electronic device is also disclosed herein. The method includes forming an inner layer having a first inside surface and a first outside surface; forming an outer layer having a second inside surface and a second outside surface, where the second inside surface of the outer layer bonds with the first inside surface of the inner layer; forming openings in the inner layer; removing a portion of the outer layer and replacing the portion with a first material of the inner layer; forming a camera-flash opening in the back of the case, where the camera-flash opening extends from the inside surface through to the outside surface; and applying a dark coloring to an edging of the camera flash opening.

The inner and outer layers of the case may be processed on extrusion, injection, blow, or compression molding equipment. They may be vacuum-formed or solution-coated. The inner layer may be processed with a different method than the outer layer, or they may both be processed with the same method.

A specific flow for making a case is described below. However, it should be understood that the invention is not limited to the specific flows and steps presented. A flow may have additional steps (not necessarily described herein), different steps which replace some of the steps presented, fewer steps or a subset of the steps presented, or steps in a different order than presented, or any combination thereof. Further, the steps in other embodiments may not be exactly the same as the steps presented and may be modified or altered as appropriate for a particular application or based on the data or situation In some embodiments, a first and second layer of the case may be formed through co-molding (or co-injection molding or sandwich molding), which is a process used to combine a first material with a second material, where the first and second materials have different properties. More specifically, co-molding may be used to combine hard plastics with soft materials. The co-molding process may be performed during a single press machine cycle, allowing a case to be manufactured within a shorter amount of time.

A first material, in liquid or melted form, is injected into a mold. The first material may be injected through a sprue, or a channel through which the material is poured into the mold. A second material, also in liquid or melted form, is then injected into the mold until the mold cavity is nearly filled. The second material may also be injected through the same sprue. The first material is injected again to purge the second material from the sprue.

In other embodiments, a first layer of a case may be formed as described below. The first layer of the case may be formed in various ways, such as cutting or using overmolding or injection molding. For overmolding, a first material (e.g., liquid or uncured plastic) is injected or poured into a first mold along with a catalyst. The mold and plastic is subjected to a temperature to activate the catalyst and material. After a sufficient time for processing to occur, the mold is opened, and the first layer removed. The first layer is cleaned and flashing removed. The mold used in the processing may include features that will form features (e.g., camera-flash opening, protrusions, and holes) of the case described herein.

A second layer of the case may then be formed and bonded to the first layer. The first layer is placed into a cavity of a second mold. The second mold is clamped (or closed) and a second material in molten form is injected into the mold cavity. Heat and pressure conditions in the second mold cause the first and second materials to partially fuse together. In an embodiment, the first layer is the inner layer of the case and the second layer is the outer layer. In another embodiment, the first layer is the outer layer and the second layer is the inner layer.

In some embodiments, openings may be formed through a first layer of the case. For example, a mold used in processing a case may have a feature that will form the openings described. The mold may have regions where plastic will be present (e.g., vessels or channels) and may also have regions where plastic will be absent (e.g., solid mold material that prevents plastic from curing or forming where the patterns or perforations are).

In some embodiments, a channel may be formed from a sidewall to an opposite sidewall of the first layer of the case. Similar to how openings may be formed, the mold used in processing the case may have a feature that forms the channel described.

The case may be made using any manufacturing technique. Some examples of manufacturing techniques that may be used to make a case include injection molding, stereolithography, selective laser sintering, fused deposition molding, polyjet, casting (e.g., cast urethane molding), CNC machining, or combinations thereof In a specific embodiment, the method includes coloring an edge of the back opening a black or other dark color, attaching a black or other dark colored grommet to the back opening, or both. The black or dark color may help to reduce the glare from a flash to a camera. This step is optional and is not included in some embodiments. Techniques to reduce or prevent glare to a camera from a flash are further described in U.S. Provisional Patent Application Ser. No. 61/365,302, filed on Jul. 16, 2010, which is incorporated herein in its entirety by reference.

The previous description of the disclosed embodiments is provided to enable any person skilled in the art to make or use the invention disclosed herein. Although the various inventive aspects are disclosed in the context of certain illustrated embodiments, implementations, and examples, it should be understood by those skilled in the art that the invention extends beyond the specifically disclosed embodiments to other alternative embodiments and/or uses of the invention and obvious modifications and equivalents thereof. In addition, while a number of variations of various inventive aspects have been shown and described in detail, other modifications that are within their scope will be readily apparent to those skilled in the art based upon reviewing this disclosure. It should be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. The generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Similarly, the disclosure is not to be interpreted as reflecting an intent that any claim set forth below requires more features than are expressly recited in that claim. Rather, as the following claims reflect, inventive aspects may reside in a combination of fewer than all features of any single foregoing disclosed embodiment.

Each of the foregoing and various aspects, together with those set forth in the claims and summarized above or otherwise disclosed herein, including the figures, may be combined without limitation to form claims for a device, apparatus, system, method of manufacture, and/or method of use.

All references cited herein are hereby expressly incorporated by reference.

What is claimed is:

1. A method of making a case for a portable electronic device comprising co-molding, wherein the case comprises:
   a base portion comprising a first layer, wherein the first layer comprises an interior surface and an exterior surface;
   first, second, third, fourth sidewalls coupled to the base portion,
      wherein the first, second, third, and fourth sidewalls are configured to surround the electronic device, and the first and third sidewalls are shorter than the second and fourth sidewalls, and
      wherein said second sidewall contiguously extends from said first sidewall to said third sidewall and said fourth sidewall contiguously extends from said first sidewall to said third sidewall;
   a groove, formed in the first layer in the base portion and oriented to run transverse to the second and fourth sidewalls,
      wherein the groove extends from the exterior surface of the first layer toward the interior surface of the first layer a first depth at a groove bottom surface, and
      wherein the groove comprises a first width, the groove extends from a first end to a second end, and the first end is opposite to the second end;

a first opening, formed in the first layer in the base portion, wherein the first opening comprises a second width and a second depth, the second depth extends from at least the exterior surface of the first layer to the interior surface, the first opening comprises a third end and a fourth end, and the third end is coupled to the first end of the groove;

a second opening, formed in the first layer in the base portion, wherein the second opening comprises a third width and a third depth, the third depth extends from at least the exterior surface of the first layer to the interior surface, the second opening comprises a fifth end and a sixth end, and the fifth end is coupled to the second end of the groove;

a first portion of an insert, formed in the first opening, wherein the first portion of the insert comprises a fourth width that is the same as the second width, and a thickness extending from at least the exterior surface of the first layer to the interior surface; and a second portion of the insert, formed in the groove, wherein the second portion of the insert comprises a fourth width that is the same as the first width, and a thickness extending from at least the exterior surface of the first layer to the groove bottom surface.

2. The method of claim 1, wherein the case further comprises a third portion of the insert, formed in the second opening, wherein the third portion of the insert comprises a sixth width that is the same as the third width, and a thickness extending from at least the exterior surface of the first layer to the interior surface.

3. The method of claim 1, wherein the first opening and the second opening are colinear.

4. The method of claim 1, wherein the first opening, the second opening, and the insert are colinear.

5. The method of claim 1, wherein the base portion further comprises a second layer that is connected to the first layer at the exterior surface of the first layer, wherein the second layer comprises a rigid material and the first layer and insert comprise a more flexible material.

6. The method of claim 1, wherein the first opening extends from within the second sidewall.

7. The method of claim 1, wherein the second opening extends from within the fourth sidewall.

8. The method of claim 1, wherein the base portion further comprises a second layer that is connected to the first layer at the exterior surface of the first layer, wherein the first layer further includes a plurality of openings that extend over the base portion in a pattern and wherein said second layer is formed of a translucent material to allow visibility of the first layer through the second layer.

* * * * *